United States Patent
Chendamarai Kannan et al.

(10) Patent No.: US 11,019,584 B2
(45) Date of Patent: May 25, 2021

(54) USER EQUIPMENT OPERATION IN BANDWIDTH NARROWER THAN SYNCHRONIZATION SIGNAL BANDWIDTH

(71) Applicant: QUALCOMM Incorporated, San Diego, CA (US)

(72) Inventors: Arumugam Chendamarai Kannan, San Diego, CA (US); Xiaoxia Zhang, San Diego, CA (US); Tao Luo, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 93 days.

(21) Appl. No.: 15/918,827

(22) Filed: Mar. 12, 2018

(65) Prior Publication Data
US 2018/0270771 A1    Sep. 20, 2018

Related U.S. Application Data

(60) Provisional application No. 62/471,294, filed on Mar. 14, 2017.

(51) Int. Cl.
*H04W 56/00* (2009.01)
*H04W 88/02* (2009.01)
(Continued)

(52) U.S. Cl.
CPC ....... *H04W 56/001* (2013.01); *H04J 11/0073* (2013.01); *H04L 27/2613* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2017/0094621 A1* | 3/2017 | Xu | H04W 56/001 |
| 2017/0251443 A1* | 8/2017 | Shin | H04L 5/0098 |

(Continued)

OTHER PUBLICATIONS

Ericsson: "NR System Sync Frequency Raster", 3GPP Draft; R1-1702121 NR System Sync Frequency Raster, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, Feb. 12, 2017, 6 pages, XP051209281, Retrieved from the Internet: URL: http://www.3gpp.org/ftp/Meetings_3GPP_SYNC/RAN1/Docs/ [retrieved on Feb. 12, 2017].

(Continued)

*Primary Examiner* — Yee F Lam
(74) *Attorney, Agent, or Firm* — Kevin T. Cheatham

(57) ABSTRACT

A base station may identify that a user equipment (UE) supports operation within a UE bandwidth that is less than a synchronization signal bandwidth used by a wireless network to transmit a synchronization signal. The base station may then generate a synchronization signal raster (e.g., sub-raster) based at least in part on the UE bandwidth being less than the synchronization signal bandwidth. The raster may ensure portions or specific sections (e.g., sub-bands) of the synchronization signal are captured by the narrowband UE. In some cases, the base station may configure or modify a synchronization signal based at least in part on wireless network support of narrowband UE operation. For example, supplementary narrowband synchronization signals transmitted over additional time and/or frequency resources, partially decodable wideband synchronization signals designed to allow partial correlation/decoding by narrowband UEs, or concatenated synchronization signal segments (e.g., in frequency) may be employed.

20 Claims, 22 Drawing Sheets

(51) Int. Cl.
*H04W 48/16* (2009.01)
*H04L 27/26* (2006.01)
*H04J 11/00* (2006.01)

(52) U.S. Cl.
CPC ....... *H04L 27/2675* (2013.01); *H04J 11/0076* (2013.01); *H04W 48/16* (2013.01); *H04W 88/02* (2013.01)

(56) References Cited

U.S. PATENT DOCUMENTS

| | | | |
|---|---|---|---|
| 2017/0289965 A1* | 10/2017 | You | H04L 5/00 |
| 2017/0332378 A1* | 11/2017 | Werner | H04W 72/042 |
| 2018/0048445 A1* | 2/2018 | Jung | H04L 5/0048 |
| 2018/0124791 A1* | 5/2018 | Werner | H04W 72/042 |
| 2018/0131487 A1* | 5/2018 | Ly | H04L 5/0048 |
| 2018/0270008 A1* | 9/2018 | Yi | H04W 72/1289 |
| 2018/0287845 A1* | 10/2018 | Kim | H04L 5/0053 |
| 2019/0053061 A1* | 2/2019 | Sui | H04L 5/0091 |
| 2019/0103931 A1* | 4/2019 | Yi | H04B 7/0639 |
| 2019/0319764 A1* | 10/2019 | Nader | H04L 5/0053 |

OTHER PUBLICATIONS

International Search Report and Written Opinion—PCT/US2018/022193—ISA/EPO—Aug. 2, 2018.
Partial International Search Report—PCT/US2018/022193—ISA/EPO—Jun. 12, 2018.

* cited by examiner

USER EQUIPMENT OPERATION IN BANDWIDTH NARROWER THAN SYNCHRONIZATION SIGNAL BANDWIDTH

CROSS REFERENCES

The present Application for Patent claims priority to U.S. Provisional Patent Application No. 62/471,294 by Chendamarai Kannan, et al., entitled "New Radio (NR) System With User Equipment (UE) Operation Bandwidth Less Than Synchronization Signal Bandwidth," filed Mar. 14, 2017, assigned to the assignee hereof.

BACKGROUND

The following relates generally to wireless communication, and more specifically to synchronization techniques for UE operation in narrower bandwidths than synchronization signal bandwidths.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a 5G New Radio (NR) system). A wireless multiple-access communications system may include a number of base stations or access network nodes, each simultaneously supporting communication for multiple communication devices, which may be otherwise known as user equipment (UE).

Some wireless communications systems may enable communication between a base station and a UE over different radio frequency spectrum operating bandwidths (e.g., wideband operation, narrowband operation, etc.). When initially performing a cell acquisition, or when identifying one or more neighbor cells when connected with a serving cell, a UE may identify one or more synchronization signals of a base station, such as a primary synchronization signal (PSS), a secondary synchronization signal (SSS), or both. The synchronization signal(s) may allow the UE to identify a physical cell ID, as well as time slot and frame synchronization, which may allow the UE to read a system information block (SIB) of a base station. Base station scheduling and UE identification of such synchronization signals may not account for the different operating bandwidths employed by UEs within the wireless communications system, resulting in synchronization inefficiencies and communication delays. Improved techniques for transmission and identification of synchronization signals may thus be desired.

SUMMARY

The described techniques relate to improved methods, systems, devices, or apparatuses that support synchronization techniques for user equipment (UE) operation bandwidths less than synchronization signal bandwidths. A base station may identify that a UE supports operation within a UE bandwidth that is less than a synchronization signal bandwidth used by a wireless technology to transmit a synchronization signal. The base station may then generate a synchronization signal raster (e.g., sub-raster) based at least in part on the UE bandwidth being less than the synchronization signal bandwidth. The raster may ensure portions or specific sections (e.g., subbands) of the synchronization signal are captured by the narrowband UE. In some cases, the base station may configure or modify a synchronization signal based at least in part on wireless technology or network support of narrowband UE operation. For example, supplementary narrowband synchronization signals transmitted over additional time and/or frequency resources, partially decodable wideband synchronization signals designed to allow partial correlation/decoding by narrowband UEs, or concatenated synchronization signal segments (e.g., in frequency) may be employed.

A method of for wireless communication is described. The method may include identifying that a UE supports operation within a UE bandwidth that is less than a synchronization signal bandwidth used by a wireless technology to transmit a synchronization signal, generating a synchronization signal raster based at least in part on the UE bandwidth being less than the synchronization signal bandwidth, and transmitting the synchronization signal in accordance with the synchronization signal raster.

An apparatus for wireless communication is described. The apparatus may include means for identifying that a UE supports operation within a UE bandwidth that is less than a synchronization signal bandwidth used by a wireless technology to transmit a synchronization signal, means for generating a synchronization signal raster based at least in part on the UE bandwidth being less than the synchronization signal bandwidth, and means for transmitting the synchronization signal in accordance with the synchronization signal raster.

Another apparatus for wireless communication is described. The apparatus may include a processor, memory in electronic communication with the processor, and instructions stored in the memory. The instructions may be operable to cause the processor to identify that a UE supports operation within a UE bandwidth that is less than a synchronization signal bandwidth used by a wireless technology to transmit a synchronization signal, generate a synchronization signal raster based at least in part on the UE bandwidth being less than the synchronization signal bandwidth, and transmit the synchronization signal in accordance with the synchronization signal raster.

A non-transitory computer readable medium for wireless communication is described. The non-transitory computer-readable medium may include instructions operable to cause a processor to identify that a UE supports operation within a UE bandwidth that is less than a synchronization signal bandwidth used by a wireless technology to transmit a synchronization signal, generate a synchronization signal raster based at least in part on the UE bandwidth being less than the synchronization signal bandwidth, and transmit the synchronization signal in accordance with the synchronization signal raster.

Some examples of the method, apparatus, and non-transitory computer-readable medium described above may further include processes, features, means, or instructions for indicating to the UE that the UE may be to perform a cell search of subbands associated with the synchronization signal raster.

In some examples of the method, apparatus, and non-transitory computer-readable medium described above, the synchronization signal raster comprises a subband resolution that may be based at least in part on the UE bandwidth being less than the synchronization signal bandwidth.

In some examples of the method, apparatus, and non-transitory computer-readable medium described above, the synchronization signal raster comprises a subband resolution that may be greater than a resolution used when a UE operating bandwidth may be at least equal to the synchronization signal bandwidth.

In some examples of the method, apparatus, and non-transitory computer-readable medium described above, generating the synchronization signal raster comprises: selecting raster points for the synchronization signal raster such that each of one or more subbands searched by the UE in accordance with the synchronization signal raster at least partially overlap with the synchronization signal bandwidth.

In some examples of the method, apparatus, and non-transitory computer-readable medium described above, the one or more subbands each overlap with the synchronization signal bandwidth by a predetermined minimum overlap.

In some examples of the method, apparatus, and non-transitory computer-readable medium described above, generating the synchronization signal raster comprises: selecting raster points for the synchronization signal raster such that each of one or more subbands searched by the UE in accordance with the synchronization signal raster overlap with subbands of the synchronization signal bandwidth that include a predetermined portion of the synchronization signal.

In some examples of the method, apparatus, and non-transitory computer-readable medium described above, the predetermined portion of the synchronization signal may be repeated within a plurality of subbands of the synchronization signal bandwidth corresponding to the raster points.

A method of for wireless communication is described. The method may include identifying that a UE supports operation within a UE bandwidth that is less than a synchronization signal bandwidth used by a wireless technology to transmit a synchronization signal, performing a cell search of subbands associated with a synchronization signal raster based at least in part on the UE bandwidth being less than the synchronization signal bandwidth, and receiving the synchronization signal based at least in part on the cell search.

An apparatus for wireless communication is described. The apparatus may include means for identifying that a UE supports operation within a UE bandwidth that is less than a synchronization signal bandwidth used by a wireless technology to transmit a synchronization signal, means for performing a cell search of subbands associated with a synchronization signal raster based at least in part on the UE bandwidth being less than the synchronization signal bandwidth, and means for receiving the synchronization signal based at least in part on the cell search.

Another apparatus for wireless communication is described. The apparatus may include a processor, memory in electronic communication with the processor, and instructions stored in the memory. The instructions may be operable to cause the processor to identify that a UE supports operation within a UE bandwidth that is less than a synchronization signal bandwidth used by a wireless technology to transmit a synchronization signal, perform a cell search of subbands associated with a synchronization signal raster based at least in part on the UE bandwidth being less than the synchronization signal bandwidth, and receive the synchronization signal based at least in part on the cell search.

A non-transitory computer readable medium for wireless communication is described. The non-transitory computer-readable medium may include instructions operable to cause a processor to identify that a UE supports operation within a UE bandwidth that is less than a synchronization signal bandwidth used by a wireless technology to transmit a synchronization signal, perform a cell search of subbands associated with a synchronization signal raster based at least in part on the UE bandwidth being less than the synchronization signal bandwidth, and receive the synchronization signal based at least in part on the cell search.

In some examples of the method, apparatus, and non-transitory computer-readable medium described above, the synchronization signal raster comprises a subband resolution that may be based at least in part on the UE bandwidth being less than the synchronization signal bandwidth.

In some examples of the method, apparatus, and non-transitory computer-readable medium described above, the synchronization signal raster comprises a subband resolution that may be greater than a resolution used when the UE bandwidth may be at least equal to the synchronization signal bandwidth.

In some examples of the method, apparatus, and non-transitory computer-readable medium described above, performing the cell search of subbands comprises: limiting the cell search to a search of one or more subbands associated with a raster definition.

In some examples of the method, apparatus, and non-transitory computer-readable medium described above, performing the cell search of subbands comprises: limiting the cell search to a search of one or more subbands that at least partially overlap with the synchronization signal bandwidth.

In some examples of the method, apparatus, and non-transitory computer-readable medium described above, the one or more subbands each overlap with the synchronization signal bandwidth by a predetermined minimum overlap.

In some examples of the method, apparatus, and non-transitory computer-readable medium described above, performing the cell search of subbands comprises: limiting the cell search to a search of one or more subbands that each overlap with a predetermined portion of the synchronization signal.

In some examples of the method, apparatus, and non-transitory computer-readable medium described above, the predetermined portion of the synchronization signal may be repeated within a plurality of subbands of the synchronization signal bandwidth corresponding to the one or more subbands of the synchronization signal raster.

A method of for wireless communication is described. The method may include identifying that a wireless technology supports narrowband UE operation within a UE bandwidth that is less than a wideband synchronization signal bandwidth used by the wireless technology to transmit a synchronization signal, configuring the synchronization signal based at least in part on the wireless technology support of narrowband UE operation, and transmitting the synchronization signal in accordance with the configuring.

An apparatus for wireless communication is described. The apparatus may include means for identifying that a wireless technology supports narrowband UE operation within a UE bandwidth that is less than a wideband synchronization signal bandwidth used by the wireless technology to transmit a synchronization signal, means for configuring the synchronization signal based at least in part on the wireless technology support of narrowband UE operation, and means for transmitting the synchronization signal in accordance with the configuring.

Another apparatus for wireless communication is described. The apparatus may include a processor, memory in electronic communication with the processor, and instructions stored in the memory. The instructions may be operable to cause the processor to identify that a wireless technology supports narrowband UE operation within a UE bandwidth that is less than a wideband synchronization signal bandwidth used by the wireless technology to transmit a synchronization signal, configure the synchronization signal based at least in part on the wireless technology support of narrowband UE operation, and transmit the synchronization signal in accordance with the configuring.

A non-transitory computer readable medium for wireless communication is described. The non-transitory computer-readable medium may include instructions operable to cause a processor to identify that a wireless technology supports narrowband UE operation within a UE bandwidth that is less than a wideband synchronization signal bandwidth used by the wireless technology to transmit a synchronization signal, configure the synchronization signal based at least in part on the wireless technology support of narrowband UE operation, and transmit the synchronization signal in accordance with the configuring.

Some examples of the method, apparatus, and non-transitory computer-readable medium described above may further include processes, features, means, or instructions for signaling that the wireless technology supports narrowband UE operation.

In some examples of the method, apparatus, and non-transitory computer-readable medium described above, signaling that the wireless technology supports narrowband UE operation comprises: including an indication of narrowband UE support in one or more of a dedicated reference signal (DRS), a radio resource control (RRC) message, or a system information block (SIB).

In some examples of the method, apparatus, and non-transitory computer-readable medium described above, configuring the synchronization signal comprises: configuring a wideband synchronization signal in a first orthogonal frequency division multiplexing (OFDM) symbol. Some examples of the method, apparatus, and non-transitory computer-readable medium described above may further include processes, features, means, or instructions for configuring one or more narrowband synchronization signals in a second OFDM symbol.

In some examples of the method, apparatus, and non-transitory computer-readable medium described above, the one or more narrowband synchronization signals each may have a bandwidth that may be less than the wideband synchronization signal bandwidth.

In some examples of the method, apparatus, and non-transitory computer-readable medium described above, the one or more narrowband synchronization signals may be comprised of a primary synchronization signal (PSS), a second synchronization signal (SSS), a physical broadcast channel (PBCH), or combinations thereof.

Some examples of the method, apparatus, and non-transitory computer-readable medium described above may further include processes, features, means, or instructions for centering the one or more narrowband synchronization signals at a same raster point as the wideband synchronization signal.

Some examples of the method, apparatus, and non-transitory computer-readable medium described above may further include processes, features, means, or instructions for offsetting raster points of the one or more narrowband synchronization signals relative to a raster point of the wideband synchronization signal.

Some examples of the method, apparatus, and non-transitory computer-readable medium described above may further include processes, features, means, or instructions for transmitting the one or more narrowband synchronization signals at a sparsity based at least in part on attributes of narrowband UEs supported by the wireless technology.

In some examples of the method, apparatus, and non-transitory computer-readable medium described above, configuring the synchronization signal comprises: configuring a wideband synchronization signal in an OFDM symbol. Some examples of the method, apparatus, and non-transitory computer-readable medium described above may further include processes, features, means, or instructions for configuring one or more narrowband synchronization signals in the OFDM symbol.

In some examples of the method, apparatus, and non-transitory computer-readable medium described above, configuring one or more narrowband synchronization signals comprises: configuring the one or more narrowband synchronization signals at predefined subbands.

In some examples of the method, apparatus, and non-transitory computer-readable medium described above, the predefined subbands include frequencies other than those occupied by the wideband synchronization signal.

In some examples of the method, apparatus, and non-transitory computer-readable medium described above, the one or more narrowband synchronization signals each may have a bandwidth that may be less than the wideband synchronization signal bandwidth.

In some examples of the method, apparatus, and non-transitory computer-readable medium described above, the one or more narrowband synchronization signals may be comprised of a PSS, a SSS, a PBCH, or combinations thereof.

In some examples of the method, apparatus, and non-transitory computer-readable medium described above, configuring the synchronization signal comprises: configuring the synchronization signal to include one or more sequences that may be each less than an entirety of the synchronization signal but which, when decoded, convey synchronization information.

In some examples of the method, apparatus, and non-transitory computer-readable medium described above, the one or more sequences may be PSS sequences and the synchronization information includes a physical cell identity (PCI) group.

In some examples of the method, apparatus, and non-transitory computer-readable medium described above, the one or more sequences may be SSS sequences and the synchronization information includes a physical cell identity (PCID).

Some examples of the method, apparatus, and non-transitory computer-readable medium described above may further include processes, features, means, or instructions for transmitting a physical broadcast channel (PBCH) in a channel separate from that used for transmitting the synchronization signal in accordance with the configuring.

In some examples of the method, apparatus, and non-transitory computer-readable medium described above, configuring the synchronization signal comprises: including, in individual subbands, one or more sequences that may be each less than an entirety of the synchronization signal but which, when decoded, convey synchronization information. Some examples of the method, apparatus, and non-transitory computer-readable medium described above may further include processes, features, means, or instructions for concatenating the individual subbands as multiple non-overlapping segments of the synchronization signal.

In some examples of the method, apparatus, and non-transitory computer-readable medium described above, the multiple non-overlapping segments may be repetitions of a same segment.

Some examples of the method, apparatus, and non-transitory computer-readable medium described above may further include processes, features, means, or instructions for transmitting a wideband synchronization signal in a first OFDM symbol. Some examples of the method, apparatus, and non-transitory computer-readable medium described above may further include processes, features, means, or instructions for transmitting the synchronization signal with individual subbands as multiple non-overlapping segments in a second OFDM symbol.

In some examples of the method, apparatus, and non-transitory computer-readable medium described above, configuring the synchronization signal comprises: applying a plurality of scrambling sequences to the synchronization signal such that individual scrambling sequences may be applied to individual subbands and such that individual subbands each include one or more sequences which, when decoded, convey synchronization information.

Some examples of the method, apparatus, and non-transitory computer-readable medium described above may further include processes, features, means, or instructions for transmitting a layer 1 signal indicating a configuration of the synchronization signal.

In some examples of the method, apparatus, and non-transitory computer-readable medium described above, the layer 1 signal indicates whether the synchronization signal includes a narrowband synchronization signal.

In some examples of the method, apparatus, and non-transitory computer-readable medium described above, the layer 1 signal indicates one of multiple locations of the narrowband synchronization signal.

In some examples of the method, apparatus, and non-transitory computer-readable medium described above, the layer 1 signal may be repeated on multiple subbands.

A method of for wireless communication is described. The method may include operating a UE in a wireless technology that supports narrowband UE operation for a UE bandwidth that is less than a wideband synchronization signal bandwidth and receiving a synchronization signal that has been configured based at least in part on the wireless technology support of narrowband UE operation.

An apparatus for wireless communication is described. The apparatus may include means for operating a UE in a wireless technology that supports narrowband UE operation for a UE bandwidth that is less than a wideband synchronization signal bandwidth and means for receiving a synchronization signal that has been configured based at least in part on the wireless technology support of narrowband UE operation.

Another apparatus for wireless communication is described. The apparatus may include a processor, memory in electronic communication with the processor, and instructions stored in the memory. The instructions may be operable to cause the processor to operate a UE in a wireless technology that supports narrowband UE operation for a UE bandwidth that is less than a wideband synchronization signal bandwidth and receive a synchronization signal that has been configured based at least in part on the wireless technology support of narrowband UE operation.

A non-transitory computer readable medium for wireless communication is described. The non-transitory computer-readable medium may include instructions operable to cause a processor to operate a UE in a wireless technology that supports narrowband UE operation for a UE bandwidth that is less than a wideband synchronization signal bandwidth and receive a synchronization signal that has been configured based at least in part on the wireless technology support of narrowband UE operation.

Some examples of the method, apparatus, and non-transitory computer-readable medium described above may further include processes, features, means, or instructions for receiving a signal that the wireless technology supports narrowband UE operation.

In some examples of the method, apparatus, and non-transitory computer-readable medium described above, receiving the signal that the wireless technology supports narrowband UE operation comprises: receiving an indication of narrowband UE support in one or more of a DRS, a RRC message, or a SIB.

In some examples of the method, apparatus, and non-transitory computer-readable medium described above, receiving the synchronization signal comprises: receiving a wideband synchronization signal in a first OFDM symbol. Some examples of the method, apparatus, and non-transitory computer-readable medium described above may further include processes, features, means, or instructions for receiving one or more narrowband synchronization signals in a second OFDM symbol.

In some examples of the method, apparatus, and non-transitory computer-readable medium described above, the one or more narrowband synchronization signals each may have a bandwidth that may be less than the wideband synchronization signal bandwidth.

In some examples of the method, apparatus, and non-transitory computer-readable medium described above, the one or more narrowband synchronization signals may be comprised of a PSS, a SSS, a PBCH, or combinations thereof.

In some examples of the method, apparatus, and non-transitory computer-readable medium described above, the one or more narrowband synchronization signals may be centered at a same raster point as the wideband synchronization signal.

In some examples of the method, apparatus, and non-transitory computer-readable medium described above, the one or more narrowband synchronization signals include raster points that may be offset relative to a raster point of the wideband synchronization signal.

Some examples of the method, apparatus, and non-transitory computer-readable medium described above may further include processes, features, means, or instructions for receiving the one or more narrowband synchronization signals at a sparsity based at least in part on attributes of narrowband UEs supported by the wireless technology.

Some examples of the method, apparatus, and non-transitory computer-readable medium described above may further include processes, features, means, or instructions for jointly detecting the wideband synchronization signal and the one or more narrowband synchronization signals.

Some examples of the method, apparatus, and non-transitory computer-readable medium described above may further include processes, features, means, or instructions for blindly detecting the one or more narrowband synchronization signals in order to determine whether narrowband UEs may be present.

In some examples of the method, apparatus, and non-transitory computer-readable medium described above, receiving the synchronization signal comprises: receiving a wideband synchronization signal in an OFDM symbol. Some examples of the method, apparatus, and non-transitory computer-readable medium described above may further include processes, features, means, or instructions for receiving one or more narrowband synchronization signals in the OFDM symbol.

In some examples of the method, apparatus, and non-transitory computer-readable medium described above, the UE may be a narrowband UE and may be scheduled to operate at predefined subbands corresponding to subbands on which the one or more narrowband synchronization signals may be transmitted.

In some examples of the method, apparatus, and non-transitory computer-readable medium described above, the predefined subbands include frequencies other than those occupied by the wideband synchronization signal.

In some examples of the method, apparatus, and non-transitory computer-readable medium described above, the UE may be a narrowband UE and may be configured to blindly search for subbands on which the one or more narrowband synchronization signals may be transmitted.

In some examples of the method, apparatus, and non-transitory computer-readable medium described above, the one or more narrowband synchronization signals each may have a bandwidth that may be less than the wideband synchronization signal bandwidth.

In some examples of the method, apparatus, and non-transitory computer-readable medium described above, the one or more narrowband synchronization signals may be comprised of a PSS, a SSS, a PBCH, or combinations thereof.

Some examples of the method, apparatus, and non-transitory computer-readable medium described above may further include processes, features, means, or instructions for jointly detecting the wideband synchronization signal and the one or more narrowband synchronization signals.

Some examples of the method, apparatus, and non-transitory computer-readable medium described above may further include processes, features, means, or instructions for blindly detecting the one or more narrowband synchronization signals in order to determine whether narrowband UEs may be present.

In some examples of the method, apparatus, and non-transitory computer-readable medium described above, receiving the synchronization signal comprises: decoding one or more sequences of the synchronization signal from one or more individual subbands of the wideband synchronization signal bandwidth, each of the one or more sequences being less than an entirety of the synchronization signal but conveying synchronization information.

In some examples of the method, apparatus, and non-transitory computer-readable medium described above, the one or more sequences may be PSS sequences and the synchronization information includes a PCI group.

In some examples of the method, apparatus, and non-transitory computer-readable medium described above, the one or more sequences may be SSS sequences and the synchronization information includes a PCID.

Some examples of the method, apparatus, and non-transitory computer-readable medium described above may further include processes, features, means, or instructions for receiving a PBCH in a channel separate from that used for receiving the synchronization signal.

In some examples of the method, apparatus, and non-transitory computer-readable medium described above, the one or more individual subbands may be each scrambled using separate scrambling sequences.

In some examples of the method, apparatus, and non-transitory computer-readable medium described above, a mapping of scrambling sequences to individual subbands may be predetermined.

Some examples of the method, apparatus, and non-transitory computer-readable medium described above may further include processes, features, means, or instructions for receiving a layer 1 signal indicating a configuration of the synchronization signal.

In some examples of the method, apparatus, and non-transitory computer-readable medium described above, the layer 1 signal indicates whether the synchronization signal includes a narrowband synchronization signal.

In some examples of the method, apparatus, and non-transitory computer-readable medium described above, the layer 1 signal indicates one of multiple locations of the narrowband synchronization signal.

In some examples of the method, apparatus, and non-transitory computer-readable medium described above, the layer 1 signal may be repeated on multiple subbands.

DETAILED DESCRIPTION

Figure 1:
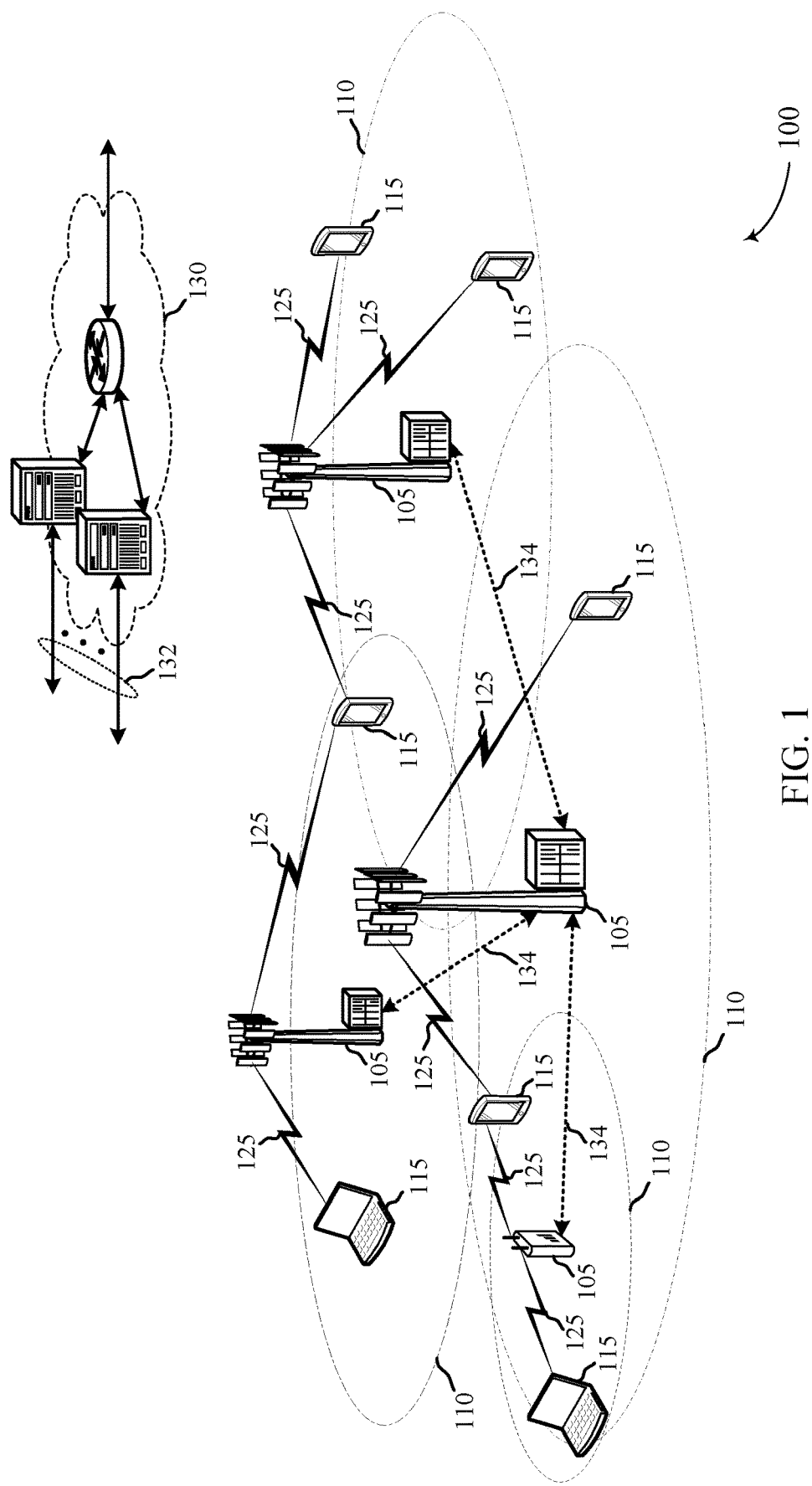
FIG. 1 illustrates an example of a system for wireless communication that supports synchronization techniques for UE operation bandwidths less than synchronization signal bandwidths in accordance with aspects of the present disclosure.

When a synchronization signal bandwidth is less than a minimum system bandwidth, a sparse synchronization raster (e.g., compared to a channel raster) may be employed to reduce user equipment (UE) initial cell search burden. Some wireless systems may support communications with UEs over an operational bandwidth (e.g., a UE bandwidth) that is less than a synchronization signal bandwidth. Sparse rastering may result in synchronization inefficiencies when synchronization signal bandwidths exceed UE operation bandwidths. For example, UEs operating with a UE bandwidth less than the synchronization signal bandwidth may capture random or arbitrary portions, or in some cases no portions at all, of the synchronization signal depending on the scheduling of the synchronization signal and the UE rastering configuration.

As such, UEs may perform synchronization signal rastering according to a sub-raster (e.g., a finer raster definition) enabling cell search on desirable (e.g., overlapping) sub-bands of the synchronization signal. For example, a sub-raster may increase the number of raster points, and thus increase the instances of capturing overlapping portions of a synchronization signal during rastering. The UE may perform cell search on subbands associated with the sub-raster. In some cases, sub-raster points may be selected to meet the criteria of a minimum non-zero overlap of a predetermined amount (for example, in MHz) between the synchronization signal bandwidth and the UE bandwidth (e.g., used for rastering), a certain portion of the synchronization signal bandwidth overlapping with the UE bandwidth, etc.

Additionally or alternatively, modifications to synchronization signals may be employed upon identifying that narrowband UEs are supported by a wireless communications system. For example, supplementary narrowband synchronization signals may be transmitted over additional time and/or frequency resources. That is, narrowband synchronization signals may be frequency division multiplexing (FDM) and/or time division multiplexing (TDM) with wideband synchronization signals. Alternatively, partially decodable wideband synchronization signals may be designed to allow partial correlation/decodability by narrowband UEs. As an extension, a wideband synchronization signal may be designed as a set of concatenated FDM synchronization signal segments (e.g., via primary synchronization signal (PSS)/secondary synchronization signal (SSS) structure design, scrambling of the wideband synchronization signal, etc.), such that each segment may be decodable by a narrowband UE. Such techniques discussed herein may result in improved synchronization in wireless communications systems supporting operation of narrowband UEs with UE bandwidths less than synchronization signal bandwidths.

Aspects of the disclosure are initially described in the context of a wireless communications system. Examples of rastering configurations, synchronization signal designs, and scrambling sequences that support synchronization techniques discussed herein are then described. Aspects of the disclosure are further illustrated by and described with reference to apparatus diagrams, system diagrams, and flowcharts that relate to synchronization techniques for UE operation bandwidths less than synchronization signal bandwidths.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support synchronization techniques for UE operation bandwidths less than synchronization signal bandwidths.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A carrier may also be referred to as a CC, a layer, a channel, etc. The term "component carrier" may refer to each of the multiple carriers utilized by a UE 115 in CA operation, and may be distinct from other portions of system bandwidth. For instance, a component carrier may be a relatively narrow bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multicarrier mode.

A carrier used for downlink may be referred to as a downlink CC, and a carrier used for uplink may be referred to as an uplink CC. A UE 115 may be configured with multiple downlink CCs and one or more uplink CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an uplink CC and a downlink CC.

The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information, e.g., acknowledgment/negative acknowledgment (ACK/NACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A UE 115 may in some cases, such as in initial system acquisition, attempt to identify one or more base stations 105 that may be transmitting in the system 100 through acquiring one or more synchronization signals transmitted by each base station 105. Based on the synchronization signals, the UE 115 may determine system timing and synchronization information, and a cell ID associated with the base station 105 that transmitted the synchronization signal. A UE 115 may first attempt to identify a PSS, which may be located in a pre-specified orthogonal frequency division multiplexing (OFDM) symbol of a subframe (e.g., in a last OFDM symbol of a first time slot of a subframe). This may enable the UE 155 to be synchronized on a subframe level. The PSS may be repeated at a known periodicity (e.g., every 5th subframe). From a PSS, the UE 115 may also obtain a physical layer identity (e.g., 0 to 2). The PSS may thus be used to acquire time-domain synchronization such as OFDM symbol synchronization, slot synchronization, frequency-domain synchronization, etc. The UE 115 may then identify an SSS. SSS symbols may also be located in the same subframe as a PSS, such as in a symbol that precedes the PSS, and based on the SSS may obtain a physical layer cell identity group number (e.g., 0 to 167). Using the physical layer identity and cell identity group number, the UE 115 may determine physical cell identity (PCI) for the cell. Once the UE 115 knows the PCI for a given cell, it may determine the location of cell reference signals and may read a system information block (SIB), which may be broadcast in a physical broadcast channel (PBCH).

A UE may sequentially monitor a system operating bandwidth according to a channel raster (e.g., 100 kHz) interval. A raster may correspond to a minimum unit (e.g., granularity or resolution) to which a UE 115 is able to read a resource (e.g., obtain synchronization information). For example, a UE 115 may pick points of a synchronization signal at a raster value level of granularity. If energy is detected in a specific raster, more detailed synchronization may then be obtained via PSS and SSS. By doing so, UE 115 may more accurately obtain a center frequency for subsequent operation. The UE may then receive PBCH and obtain an operational bandwidth (e.g., via a master information block (MIB)). By doing so, the UE may obtain the range for the UEs operating bandwidth (e.g., in frequency) for communication of control information and/or data.

In some cases, the UE 115 bandwidth may be less than a synchronization signal bandwidth (e.g., a synchronization bandwidth). Further, synchronization bandwidths may depend on subcarrier spacing (e.g., 15 kHz subcarrier spacing with max synchronization signal bandwidth of 5 MHz, 30 kHz subcarrier spacing with max synchronization signal bandwidth of 10 MHz, 240 kHz subcarrier spacing with max synchronization signal bandwidth of 80 MHz, etc.). As an example, in a system with 30 kHz subcarrier spacing, a synchronization signal may have a bandwidth of 10 MHz and some UEs may support 5 MHz operation (e.g., ultra reliable low latency communication (URLLC) systems). When a synchronization bandwidth is equal to the minimum system bandwidth, a synchronization raster may be the same as a channel raster. When a synchronization bandwidth is less than the minimum system bandwidth, a sparse synchronization raster (e.g., compared to a channel raster) may be employed to reduce UE initial cell search burden. In some cases, sparse rastering may result in synchronization inefficiencies when synchronization signal bandwidths exceeding UE operational bandwidths.

According to techniques described herein, wireless communications system 100 may support communications with UEs 115 over an operational bandwidth (e.g., a UE bandwidth) that is less than a synchronization signal bandwidth. UEs 115 may perform synchronization signal rastering according to a sub-raster (e.g., a raster definition) enabling cell search on desirable (e.g., overlapping) subbands of the synchronization signal. As such, the UE 115 may perform cell search on subbands associated with the sub-raster. Additionally or alternatively, upon identifying narrowband UEs are supported by the wireless communications system 100, supplementary narrowband synchronization signals (e.g., transmitted over additional time and/or frequency resources), partially decodable wideband synchronization signals, and/or concatenated FDM synchronization signal segments may be employed.

Figure 2:
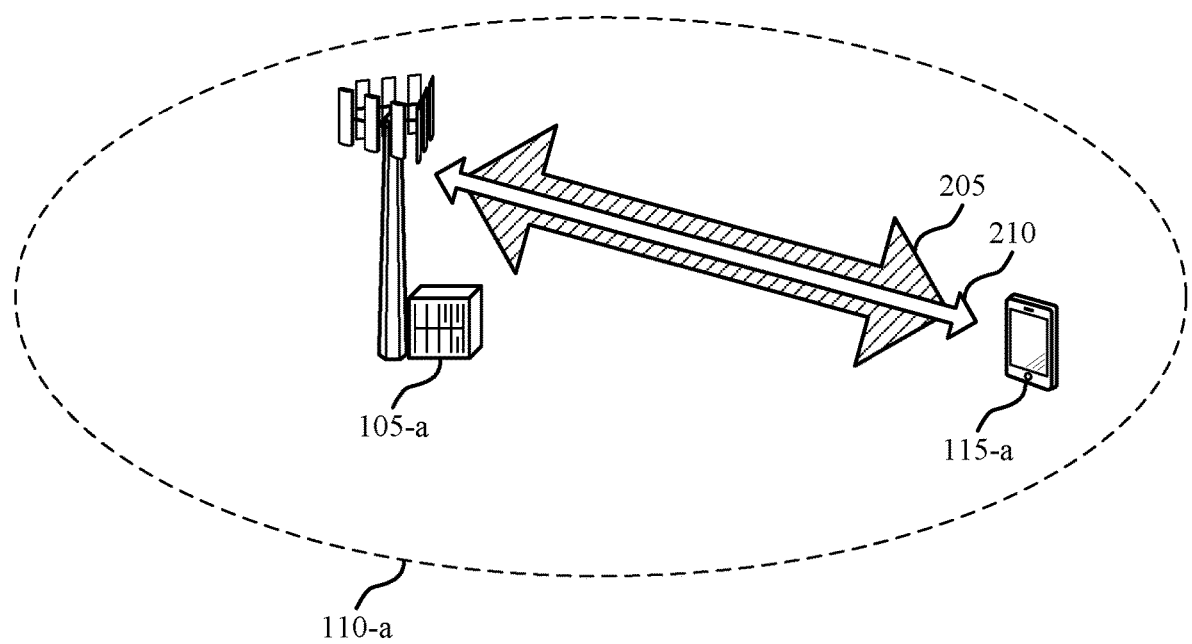
FIG. 2 illustrates an example of a wireless communications system that supports synchronization techniques for UE operation bandwidths less than synchronization signal bandwidths in accordance with aspects of the present disclosure.

FIG. 2 illustrates an example of a wireless communications system 200 that supports synchronization techniques for UE operation bandwidths less than synchronization signal bandwidths. The wireless communications system 200 may include a base station 105-*a* and UE 115-*a*, which may be examples of the corresponding devices as described with reference to FIG. 1. Base station 105-*a* may communicate over a system operating bandwidth within a coverage area 110-*a*. Further, base station 105-*a* may utilize synchronization signals (e.g., for cell acquisition procedures with UE 115-*a*). Synchronization signals may be transmitted over a synchronization signal bandwidth 205, which may be equal to or less than the system operating bandwidth. Further, base station 105-*a* and UE 115-*a* may communicate over a UE bandwidth 210. In some cases, the UE bandwidth 210 may be less than the synchronization signal bandwidth 205. That is, wireless communications system 200 may support communications with UEs 115 over UE bandwidths 210 that are less than synchronization signal bandwidths 205.

UE 115-*a* may perform synchronization signal rastering according to a sub-raster (e.g., a finer raster definition) enabling cell search on desirable (e.g., overlapping) subbands of the synchronization signal bandwidth 205. For example, a sub-raster may increase the number of raster points, and thus increase the granularity to which UE 115-*a* may capture overlapping portions of a synchronization signal during rastering. The UE 115-*a* may perform cell search on subbands associated with the sub-raster across the UE bandwidth 210. In some cases, sub-raster points may be selected to meet the criteria of a minimum non-zero overlap of B MHz between the synchronization signal bandwidth 205 and the UE bandwidth 210, a certain portion (e.g., specific section) of the synchronization signal bandwidth 205 overlapping with the UE bandwidth 210, etc.

Additionally or alternatively, modifications to synchronization signals may be employed upon identifying that narrowband UEs (e.g., UE 115-*a*) are supported by wireless communications system 200. For example, base station 105-*a* may transmit supplementary narrowband synchronization signals over additional time and/or frequency resources. That is, narrowband synchronization signals may be FDM and/or TDM with wideband synchronization signals. Further, partially decodable wideband synchronization signals may be designed to allow partial correlation/decodability by UE 115-*a*. As an extension, a wideband synchronization signal may be designed as a set of concatenated FDM synchronization signal segments (e.g., via PSS/SSS design, scrambling of the wideband synchronization signal, etc.), such that each segment may be decodable by the UE 115-*a*.

In some cases, base station 105-*a* may transmit a layer 1 signal as part of a NR synchronization signal (SS) block to indicate synchronization information (e.g., a synchronization signal configuration). For example, the layer 1 signal may include information such as whether or not a narrowband synchronization signal is present (e.g., within the SS block). The layer 1 signal may further indicate one or more possible locations and/or configurations of narrowband synchronization signals. In some cases, the layer 1 signal may be repeated every subband. The information may be used by wideband UEs (e.g., for rate matching) and by narrowband UEs (e.g., UE 115-a) for subsequent cell acquisition. Layer 1 signaling may be used in addition to the synchronization signal designs and techniques described herein. By analogy, the layer 1 signaling may resemble physical control format indicator channel (PCFICH) equivalent for synchronization signals.

In some cases, wideband UEs may utilize both narrowband and wideband synchronization signals for cell acquisition. For example, if the wideband UE is aware narrowband synchronization signals are present (e.g., via layer 1 signaling), the wideband UE may further improve its coverage by jointly detecting the wideband synchronization signal and the narrowband synchronization signal. If the wideband UE is not aware that narrowband signals are present, the wideband UE may use blind detection (e.g., via hypothesis testing) of the narrowband signals. In such cases, the wideband UE may learn or discover the potential presence of narrowband UEs in the network via a detection of such narrowband synchronization signals. For example, in the case of mmW systems, the UE may learn about the presence of narrowband UEs in a particular beam direction.

Additionally, techniques discussed herein may be used on an individual synchronization signal basis. That is, different techniques discussed may be used for different synchronization signals (e.g., PSS and/or SSS may lend itself to one solution, while PBCH may lend itself to another solution). In some cases, a synchronization signal bandwidth associated with a wireless technology may be greater than a system operating bandwidth. For example, if a thin segment of licensed spectrum (e.g., a segment less than a synchronization signal bandwidth associated with NR technology) is available to an operator, both the system bandwidth and the UE bandwidth may be less than the synchronization signal bandwidth. For example, a wireless technology may support Y MHz synchronization signal bandwidth, and a particular wireless network (e.g., utilizing the wireless technology) may support X MHz, such that X<Y. A UE operating in the wireless network may support a bandwidth equal to or less than X. In such cases, techniques described may still apply. Further, some deployments may not support the techniques discussed herein, or other similar techniques. In such scenarios, UEs operating with a UE bandwidth less than a synchronization signal bandwidth (e.g., narrowband UEs) may not be supported.

In some examples, UEs may identify a random access channel (RACH) for random access transmissions, and may identify RACH resources (time and frequency resources) on which to transmit the random access transmissions based at least in part on the wideband synchronization signal received by the UE. However, narrowband UEs such as the UE 115-a may receive only a portion of a synchronization signal. For example, the UE 115-a may receive a top half of the synchronization signal or a bottom half of the synchronization signal. In some examples, the UE 115-a may transmit an indication of a received portion of the synchronization signal. In some cases, the portion of the received synchronization signal may correlate to a portion of a RACH, and the base station 105-a may identify transmissions from the UE 115-a based at least in part on the indication. In some other cases, the base station 105-a may identify a RACH for transmissions by the UE 105-a based at least in part on the indication, and may transmit information about the RACH to the UE 105-a.

Figure 3A:
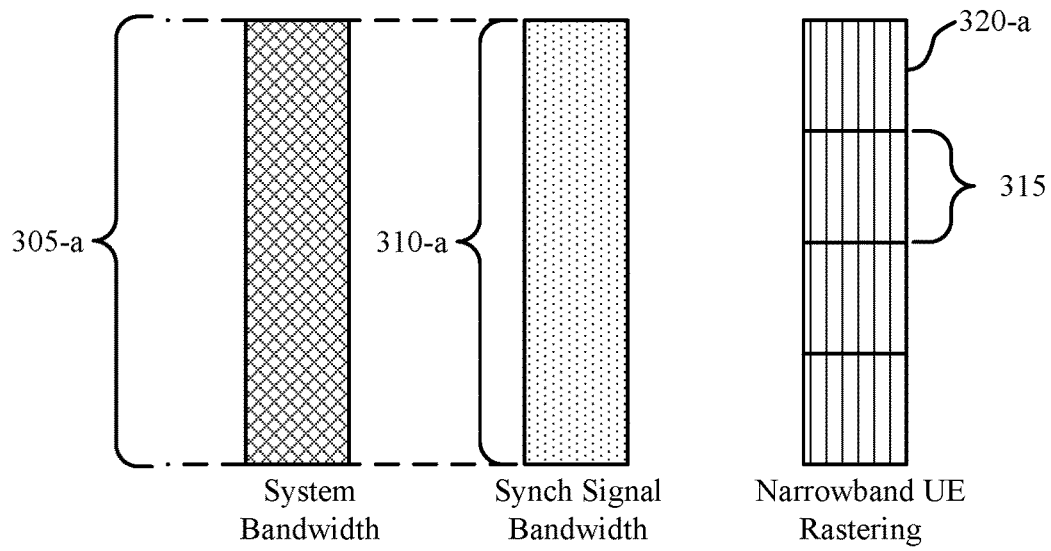
FIGS. 3A and 3B illustrate examples of rastering configurations that support synchronization techniques for UE operation bandwidths less than synchronization signal bandwidths in accordance with aspects of the present disclosure.
Figure 3B:
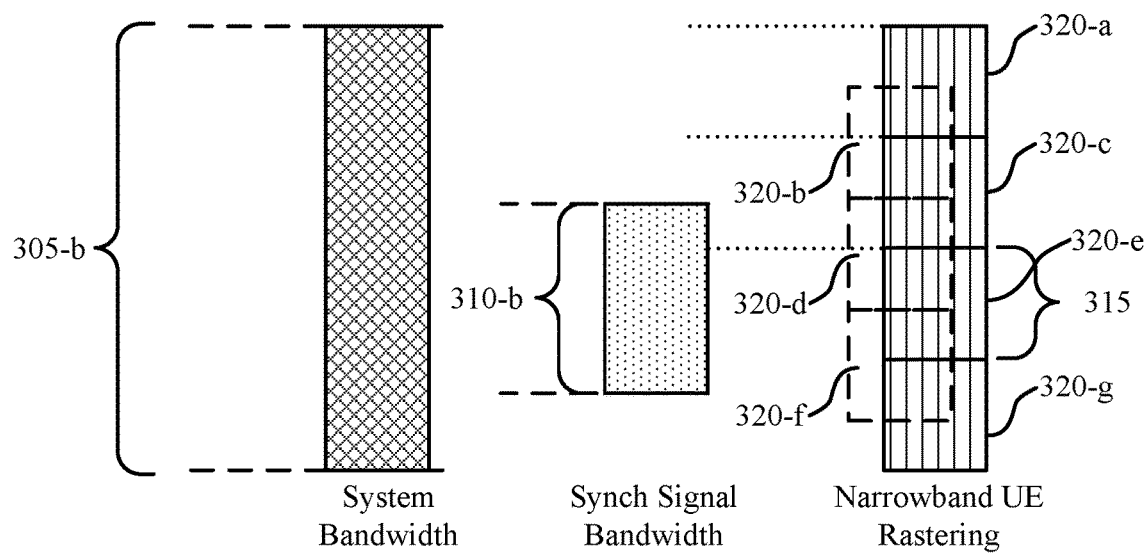

FIGS. 3A and 3B illustrate examples of rastering configurations 300 and 301, respectively, that support synchronization techniques for UE operation bandwidths less than synchronization signal bandwidths in accordance with various aspects of the present disclosure. Specifically, FIGS. 3A and 3B may illustrate examples of system, synchronization signal, and UE bandwidth relationships, in addition to rastering and sub-raster implications. A wireless communications system may operate over a system bandwidth 305, synchronization signals within the wireless communications system may be transmitted over a synchronization signal bandwidth 310, and UEs within the wireless communications system may operate over a UE bandwidth 315. Techniques discussed below may be utilized by base stations 105 and UEs 115 as described with reference to FIGS. 1 and 2.

In the example of FIG. 3A, the synchronization signal bandwidth 310-a may equal the system bandwidth 305-a. Additionally, UE bandwidth 315 may be less than the synchronization signal bandwidth 310-a. In some cases, the UE bandwidth 315 may be associated with a narrowband UE. In such cases where the synchronization signal bandwidth 310-a equals the system bandwidth 305-a, wideband UEs (e.g., UEs associated with bandwidths larger than bandwidth 315) may employ channel rastering (not illustrated by "narrowband UE rastering").

In the example of FIG. 3B, the synchronization signal bandwidth 310-b may be less than the system bandwidth 305-b. Additionally, UE bandwidth 315 may be less than the synchronization signal bandwidth 310-b. In some cases, the UE bandwidth 315 may be associated with a narrowband UE. In such cases where the synchronization signal bandwidth 310-b is less than the system bandwidth 305-b, wideband UEs (e.g., UEs associated with bandwidths larger than bandwidth 315) may employ sparse rastering (e.g., compared to channel rastering discussed above). That is, wideband UEs may raster using a reduced set of raster points (e.g., to reduce UE initial cell search burden). Narrowband UEs may thus raster according to raster locations 320, as illustrated by "narrowband UE rastering."

When a synchronization signal is scheduled arbitrarily (e.g., over a bandwidth 310-b within system bandwidth 305), narrowband UEs may capture different and arbitrary portions of the synchronization signal depending on the frequency subband in which they are scheduled (e.g., the raster locations 320). At the time of acquisition, such narrowband UEs may not know exactly on which subbands they are scheduled. Further, some allocations of narrowband UEs may not overlap with any portion of the synchronization signal at all. For example, raster location 320-a may not overlap with the synchronization signal at all, and raster location 320-b may capture an arbitrary chunk or portion of the synchronization signal.

The example of FIG. 3A illustrates four raster locations 320 (e.g., four raster intervals, raster points, etc.). However, according to techniques described herein, narrowband UEs may utilize sub-rasters, such that additional raster locations 320 may be used to improve synchronization (e.g., capturing of the synchronization signal). FIG. 3B illustrates an example usage of sub-rasters (e.g., raster location 320-b), illustrated by dashed raster locations. A narrowband UE may pick points to capture the synchronization signal at the sub-raster level of granularity. As shown, a narrowband UE may select from seven raster locations 320-a, 320-b, 320-c, 320-d, 320-e, 320-f, 320-g, according to the defined sub-rasters. All sub-rasters may each be associated with a UE bandwidth 315, but capture the synchronization signal at different raster points as shown. As such, narrowband UEs may only perform cell search over the subbands associated with selected sub-rasters. In some cases, sub-raster points (e.g., raster locations 320) that meet criteria of a non-zero overlap of B MHz with the synchronization signal bandwidth 310-*b* may be selected. Further, sub-raster points may be selected such that a certain section (e.g., an exact same portion) overlap exists with the synchronization signal bandwidth 310-*b*, as described in greater detail below.

Figure 4A:
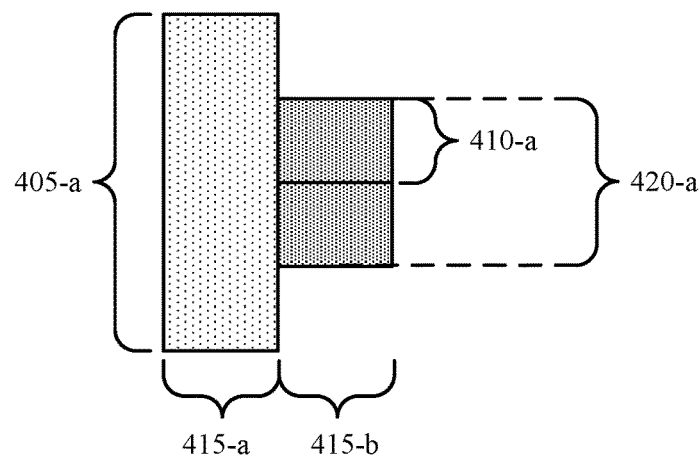
FIGS. 4A, 4B and 4C illustrate examples of synchronization signal configurations that support synchronization techniques for UE operation bandwidths less than synchronization signal bandwidths in accordance with aspects of the present disclosure.
Figure 4B:
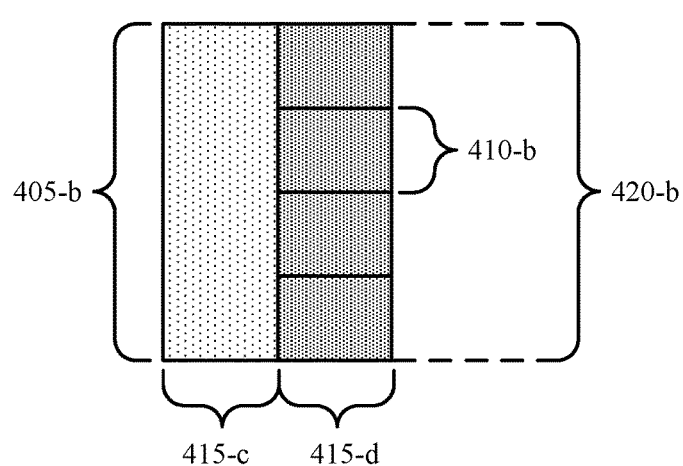
Figure 4C:
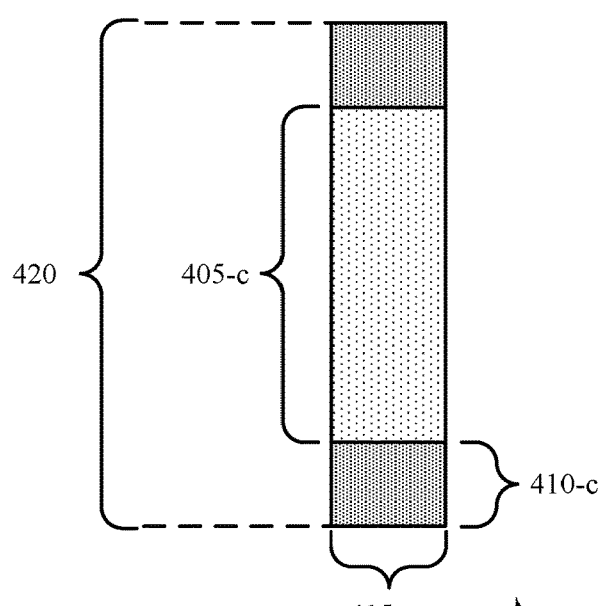

FIGS. 4A, 4B and 4C illustrate examples of synchronization signal configurations 400, 401, and 402, respectively, that support synchronization techniques for UE operation bandwidths less than synchronization signal bandwidths in accordance with various aspects of the present disclosure. Specifically, FIGS. 4A, 4B and 4C may illustrate examples of supplementary narrowband synchronization signals transmitted over additional time and/or frequency resources. A wideband synchronization signal may be associated with a wide bandwidth 405 and narrowband synchronization signals may be associated with a narrow bandwidth 410. In some cases, narrowband synchronization signals may include PSS, SSS, and PBCH in a narrower band. Synchronization signal configurations 400, 401, and 402 may be utilized by base stations 105 and UEs 115 as described with reference to FIGS. 1 and 2.

In the example of FIG. 4A, synchronization signal configuration 400 may illustrate TDM of wideband and narrowband synchronization signals. Additional OFDM symbols may be reserved within a SS block for transmission of narrowband synchronization signals to narrowband UEs 115. For example, symbols 415-*a* and 415-*b* may be located within a NR SS block. A wideband synchronization signal (e.g., a NR synchronization signal associated with a wide bandwidth 405-*a*) may be transmitted in a first symbol 415-*a*, and narrowband synchronization signals (e.g., such as a NR narrowband synchronization signal associated with narrow bandwidth 410-*a*) may be transmitted in a second symbol 415-*b*. Symbols reserved for narrowband synchronization signals (e.g., symbol 415-*b*) may be associated with a bandwidth less than wide bandwidth 405-*a*. That is, a bandwidth 420-*a* over which all narrowband synchronization signals are sent in symbol 415-*b* may be less than the wide bandwidth 405-*a* of the wideband synchronization signal transmitted in symbol 415-*a*. The narrowband synchronization signals may be centered at a same raster point as the wideband synchronization signal raster point. In other cases, narrowband synchronization signals may be positioned according to some offset or shift relative to a raster point of the wideband synchronization signal raster point.

Further, as shown in the example of FIG. 4A, transmission of narrowband synchronization signals may be optional or sparse as compared to the wideband synchronization signal (e.g., two synchronization signals transmitted in symbol 415-*b*), contingent on the support of narrowband UEs 115 by base stations 105. In such scenarios, a base station 105 may indicate (e.g., via regular discovery reference signal (DRS), system information block (SIB), radio resource control (RRC), etc.) to wideband UEs whether narrowband UEs (and hence narrowband synchronization signals) are supported during a given time interval. For example, a wideband UE may receive the indication from the base station informing whether to rate match around irregularly or sparsely transmitted narrowband synchronization signals. For example, if narrowband synchronization signals are present, rate matching around PSS/SSS/discovery signals may be performed based on a first configuration (e.g., the wideband UE may skip certain tones during physical downlink shared channel (PDSCH) processing). If dormant, rate matching around such signals may be performed based on a second configuration.

In the example of FIG. 4B, synchronization signal configuration 401 may illustrate TDM of wideband and narrowband synchronization signals. Additional OFDM symbols may be reserved within a SS block for transmission of narrowband synchronization signals to narrowband UEs 115. For example, symbols 415-*c* and 415-*d* may be located within a NR SS block. A wideband synchronization signal (e.g., a NR synchronization signal associated with a wide bandwidth 405-*b*) may be transmitted in a first symbol 415-*c*, and narrowband synchronization signals (e.g., such as a NR narrowband synchronization signal associated with narrow bandwidth 410-*b*) may be transmitted in a second symbol 415-*d*. Symbols reserved for narrowband synchronization signals (e.g., symbol 415-*d*) may be associated with a bandwidth equal to wide bandwidth 405-*b*. That is, a bandwidth 420-*b* over which all narrowband synchronization signals are sent in symbol 415-*d* may be equal to the wide bandwidth 405-*b* of the wideband synchronization signal transmitted in symbol 415-*c*. The narrowband synchronization signals may be centered at a same raster point as the wideband synchronization signal raster point. In other cases, narrowband synchronization signals may be positioned according to some offset or shift relative to a raster point of the wideband synchronization signal raster point.

In the example of FIG. 4C, synchronization signal configuration 402 may illustrate FDM of wideband and narrowband synchronization signals. Additional tones (e.g., narrow bandwidths 410) may be reserved within a symbol 415-*e* for transmission of narrowband synchronization signals to narrowband UEs. For example a wideband synchronization signal (e.g., a NR synchronization signal associated with a wide bandwidth 405-*c*) and narrowband synchronization signals (e.g., such as a NR narrowband synchronization signal associated with narrow bandwidth 410-*c*) may be transmitted in symbol 415-*e*. That is, in the FDM example of FIG. 4C, narrowband synchronization signals may be augmented in the frequency domain along with a wideband synchronization signal.

Given the specific locations (e.g., via layer 1 signaling) of narrowband synchronization signals within a total bandwidth 420 scheduled on symbol 415-*e* (e.g., narrow bandwidth 410-*c*), narrowband UEs may be scheduled only on subbands associated with these specific locations. Alternatively, narrowband synchronization signals may occur at one of multiple predefined locations (e.g., two locations as illustrated), and narrowband UEs may perform a blind search on all possible locations. As discussed above with reference to FIG. 2, joint detection of wideband and narrowband synchronization signals by wideband UEs may improve coverage and reliability in scenarios described above.

Figure 5A:
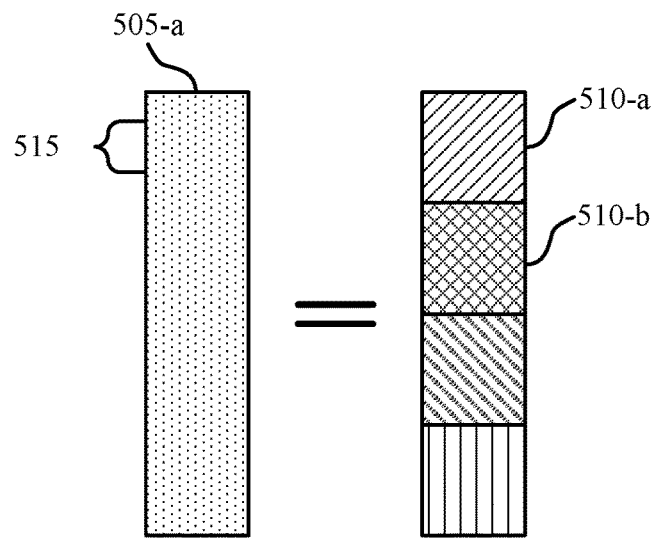
FIGS. 5A and 5B illustrate examples of synchronization signal designs that support synchronization techniques for UE operation bandwidths less than synchronization signal bandwidths in accordance with aspects of the present disclosure.
Figure 5B:
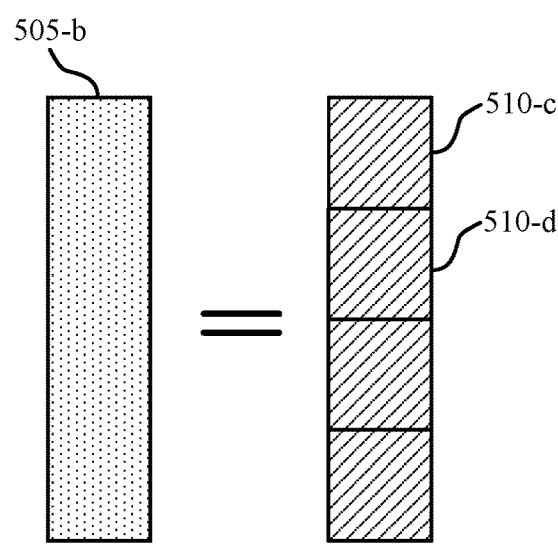

FIGS. 5A and 5B illustrate examples of synchronization signal designs 500 and 501, respectively, that support synchronization techniques for UE operation bandwidths less than synchronization signal bandwidths in accordance with various aspects of the present disclosure. Specifically, FIGS. 5A and 5B may illustrate examples of partially decodable wideband synchronization signal designs and FDM concatenated narrowband synchronization signal designs. FIGS. 5A and 5B include wideband synchronization signals 505 and synchronization segments 510 (e.g., which, in some cases, may refer to or include narrowband synchronization signals). Synchronization signal designs 500 and 501 may be utilized by base stations 105 and UEs 115 as described with reference to FIGS. 1 and 2.

In some cases (e.g., when no additional narrowband synchronization signals are used), a PSS sequence for a wideband synchronization signal 505 may be chosen such that partial correlation of a select portion of the PSS sequence still retains desirable correlation properties and a unique signature to convey synchronization information (e.g., PCI group for narrowband UEs). Further, a SSS sequence for a wideband synchronization signal 505 may be chosen such that partial correlation of a select portion of the SSS sequence still retains desirable correlation properties and a unique signature to convey synchronization information (e.g., PCI for narrowband UEs). In such cases, the PBCH for narrowband synchronization may be conveyed by a separate channel, which may be decoded after timing and cell ID information is detected (e.g., from the PSS/SSS). For example, portion 515 may include portions of PSS/SSS sequences that retain desirable correlation properties and a unique signature to convey synchronization information. Narrowband UEs may limit operation to subbands where the partial decodability of the narrowband synchronization block is supported (e.g., subbands associated with portion 515). As such, partially decodable wideband synchronization signal designs may support narrowband UE synchronization.

Additionally or alternatively, at least PSS and SSS may be designed as a concatenation of multiple non-overlapping segments (e.g., PSS/SSS have concatenated FDM designs). Each synchronization segment 510 may be individually detectable by a narrowband UE. That is, synchronization signal 505-a may be detected as a whole by wideband UEs while narrowband UEs may jointly detect one of the synchronization segments 510 that compose the synchronization signal 505-a. In such examples, PBCH for narrowband UEs may be conveyed by a separate channel, which may be decoded after the timing and cell ID are detected. FIG. 5A illustrates four different synchronization segments 510 making up the synchronization signal 505-a. That is synchronization segment 510-a may contain different information than synchronization segments 510-b (e.g., for different narrowband UEs).

In the example of FIG. 5B, each synchronization segment 510 that makes up the synchronization signal 510-b may be the same. That is, synchronization segment 510-c, synchronization segment 510-d, and all synchronization segments 510 that make up the synchronization signal 510-b may be a repeated copy of the same basic block. In some cases, the techniques described in the examples of FIGS. 5A and 5B may be extended to the TDM symbol containing the wideband synchronization signal with reference to FIGS. 4A, 4B and 4C. As such, concatenated FDM synchronization signal designs may support narrowband UE synchronization.

Figure 6A:
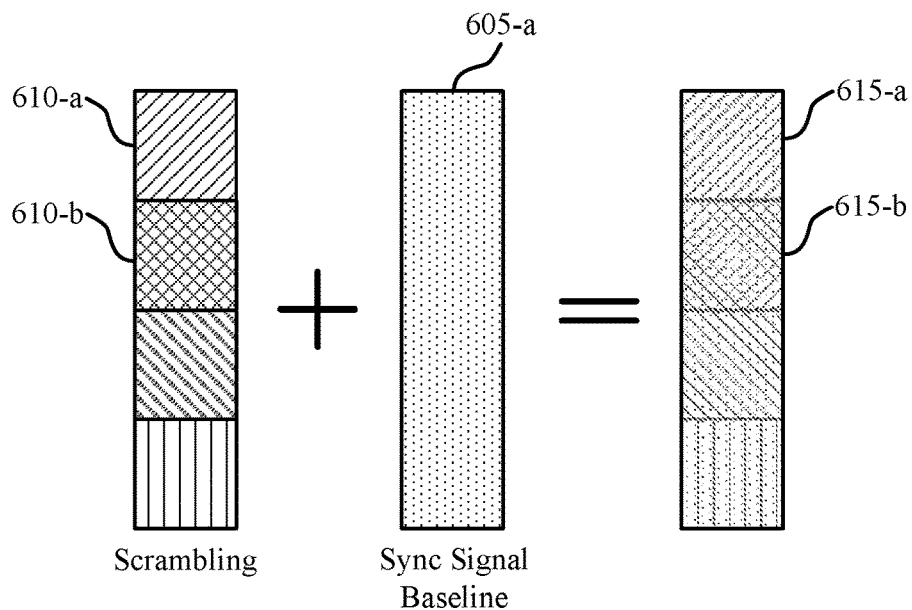
FIGS. 6A and 6B illustrate examples of synchronization signal scrambling that support synchronization techniques for UE operation bandwidths less than synchronization signal bandwidths in accordance with aspects of the present disclosure.
Figure 6B:
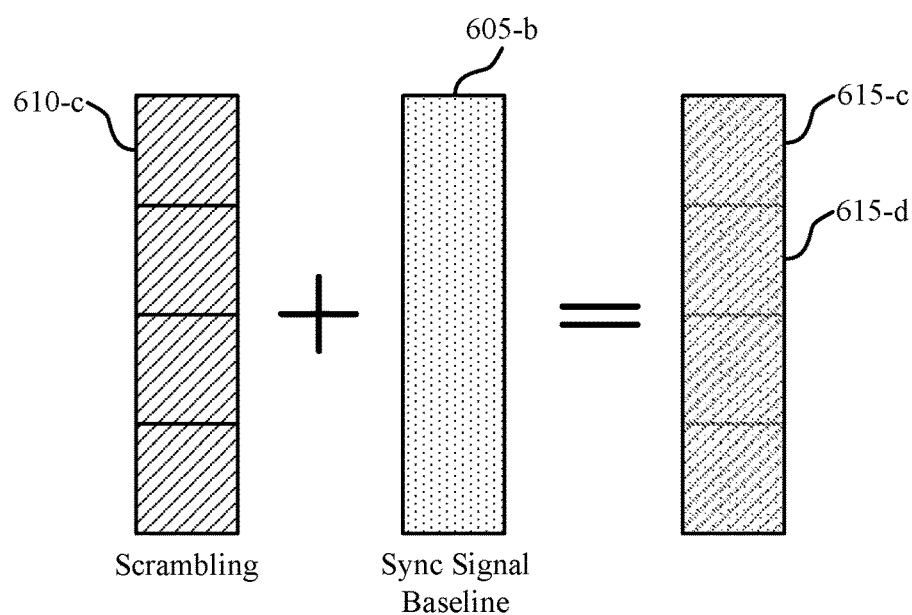

FIGS. 6A and 6B illustrate synchronization signal scrambling examples 600 and 601, respectively, that support synchronization techniques for UE operation bandwidths less than synchronization signal bandwidths in accordance with various aspects of the present disclosure. Specifically, FIGS. 6A and 6B may illustrate examples of wideband synchronization scrambling (e.g., block-wise scrambling of PSS/SSS). FIGS. 6A and 6B include wideband synchronization signals 605, scrambling sequences 610, and synchronization segments 615 (e.g., which, in some cases, may refer to or include narrowband synchronization signals, may be individually decoded by narrowband UEs). Synchronization signal scrambling examples 600 and 601 may be utilized by base stations 105 and UEs 115 as described with reference to FIGS. 1 and 2.

Similar benefits associated with the examples of FIGS. 5A and 5B may be achieved with an independent wideband synchronization signal design as a baseline, via the use of scrambling. Specifically, additional scrambling may be applied to the baseline synchronization signal wave form (e.g., scrambling sequences 610 (e.g., Zadoff-Chu sequences) may be applied to wideband synchronization signals 605). In the example of FIG. 6A, different scrambling sequences may be used on different portions (e.g., bandwidths) of wideband synchronization signal 605-a. For example, scrambling sequence 610-a may be associated with a different scrambling seed than scrambling sequence 610-b. As a result, synchronization segment 615-a may be different than synchronization segment 615-b. The use of different scrambling seeds (e.g., different scrambling sequences 610) may result in the appearance of different synchronization signals (e.g., synchronization segments 615) to narrowband UEs. However, wideband UEs may be aware of the scrambling sequence (e.g., all scrambling sequences 610 used), and may interpret the aggregate synchronization segments 615 as the single wideband synchronization signal 605-a.

In the example of FIG. 6B, the same scrambling sequence 610 may be used on all portions (e.g., over the whole bandwidth) of wideband synchronization signal 605-b. For example, scrambling sequence 610-c may be associated with a scrambling seed used to generate all resulting synchronization segments 615. As a result, synchronization segment 615-a may be the same as synchronization segment 615-b. The use of a single scrambling seed (e.g., scrambling sequence 610-c) may result in the appearance of repeated narrowband synchronization signals (e.g., synchronization segments 615) to narrowband UEs. Each synchronization segment 615 may be a repeated copy of the same basic block. Wideband UEs may be aware of the scrambling sequence 610-c (e.g., the scrambling seed used), and may interpret the aggregate synchronization segments 615 as the single wideband synchronization signal 605-b.

Scrambling sequences 610 may be applied to wideband synchronization signals 605 to achieve desirable correlation properties on a per-segment (e.g., per synchronization segment 615) basis. In some cases, sequences may regularly be present and wideband UEs may unscramble the sequence prior to detection. In other cases, scrambling sequences 610 may be optionally present, in which case wideband UEs may blindly test a hypothesis on the presence of the scrambling sequences 610. In effect, the overall wideband synchronization signal 605 (e.g., PSS and SSS) may appear as a concatenation of multiple non-overlapping segments (e.g., synchronization segments 615), each with certain desirable properties for narrowband UEs. The PBCH for narrowband UEs may be conveyed by a separate channel, which may be decoded after timing and cell ID are detected.

Figure 7:
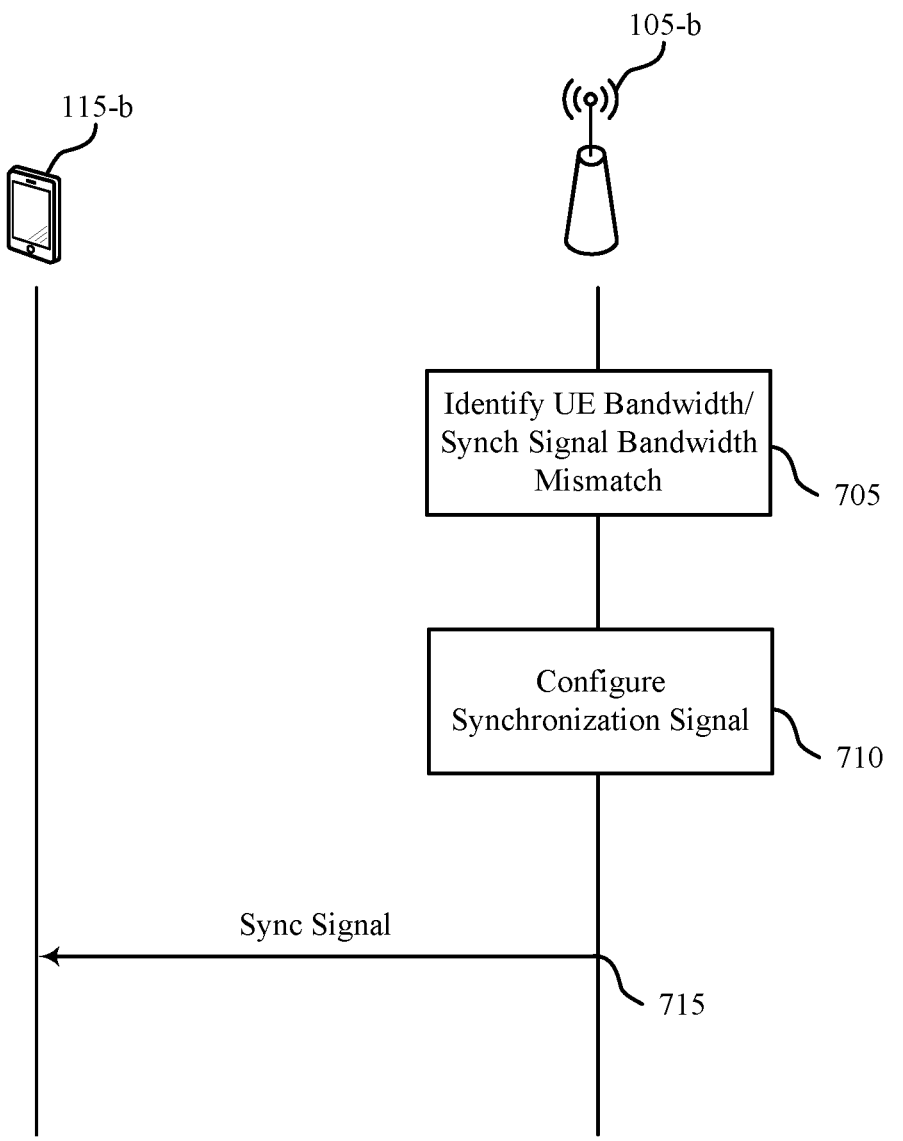
FIGS. 7 and 8 illustrates examples of process flows that support synchronization techniques for UE operation bandwidths less than synchronization signal bandwidths in accordance with aspects of the present disclosure.

FIG. 7 illustrates an example of a process flow 700 that supports synchronization techniques for UE operation bandwidths less than synchronization signal bandwidths in accordance with various aspects of the present disclosure. Process flow 700 may include a base station 105-b and a UE 115-b, which may represent aspects of techniques performed by a base station 105 or UE 115 as described with reference to FIGS. 1 through 6B.

At step 705, base station 105-b may identify that a wireless network supports narrowband UE operation within a UE bandwidth that is less than a wideband synchronization signal bandwidth. In some cases, the base station 105-b may transmit an indication that the wireless network supports narrowband UE operation (e.g., to UE 115-b or other wideband UEs in the network). The indication may be included in a DRS, RRC message, SIB, etc.

At step 710, base station 105-b may configure the synchronization signal based on the identified UE bandwidth being less than the synchronization signal bandwidth. In some cases, the synchronization signal may be configured as a wideband synchronization signal in a first OFDM symbol and one or more narrowband synchronization signals in a second OFDM symbol. The narrowband synchronization signals may each have a bandwidth less than the wideband synchronization signal bandwidth. The narrowband synchronization signals may include PSS, SSS, and/or PBCH. The narrowband synchronization signals may be centered at a same raster point as the wideband synchronization signal. In other cases, the raster points of the narrowband synchronization signals may be offset relative to a raster point of the wideband synchronization signal.

In some cases, the synchronization signal configuration may include a wideband synchronization signal and narrowband signals in a single OFDM symbol (e.g., FDM synchronization signal design). In such cases, the narrowband synchronization signals may be configured at predefined subbands. The predefined subbands may include frequencies not occupied by the wideband synchronization signal.

In some cases, the synchronization signal configuration may include sequences that are less than the entirety of the synchronization signal but, when decoded, convey synchronization information. Individual subbands may then be concatenated as multiple non-overlapping segments of the synchronization signal. The segments may be different, or repetitions of a same segment, depending on the sequence used for the configuration. The sequence may include a PSS sequence, and the synchronization information may include a PCI group. Alternatively, the sequence may include a SSS sequence, and the synchronization information may include a PCI. In such cases, the PBCH may be transmitted in a separate channel according to the configuration.

In some cases, multiple scrambling sequences may be applied to the wideband synchronization signal such that individual scrambling sequences are applied to individual subbands and such that individual subbands each include one or more sequences which, when decoded, convey synchronization information. The multiple scrambling sequences may be predetermined. The sequence may include a PSS sequence, and the synchronization information may include a PCI group. Alternatively, the sequence may include a SSS sequence, and the synchronization information may include a PCI. In such cases, the PBCH may be transmitted in a separate channel according to the configuration.

In some case, base station 105-b may use layer 1 signaling to indicated the configuration of the synchronization signal. The layer 1 signal may indicate whether the synchronization signal includes a narrowband synchronization signal. The layer 1 signal may further indicate multiple locations of the narrowband synchronization signals. The layer 1 signal may be repeated on multiple subbands.

At step 715, base station 105-b may transmit the configured synchronization signal to the UE 115-b. In some cases (e.g., if the configured synchronization signal includes narrowband synchronization signals), the narrowband synchronization signals may be transmitted at a sparsity based on the attributes of narrowband UEs supported by the wireless network. UE 115-b may be scheduled to operate at predefined subbands corresponding to subbands on which the multiple narrowband synchronization signals are transmitted. In some cases, other wideband UEs (not shown) may perform blind detection of any narrowband synchronization signals to determine whether narrowband UEs (e.g., UE 115-b) is present. That is, other wideband UEs may jointly detect wideband and narrowband synchronization signals.

In some examples, the UE 115-b may transmit an indication of the received portion of the synchronization signal. The UE 115-b may transmit a message on a RACH determined based at least in part on the received portion of the synchronization signal. For example, the RACH may be determined by the UE 115-b, or may be identified based on an instruction from the base station 105-b.

Figure 8:
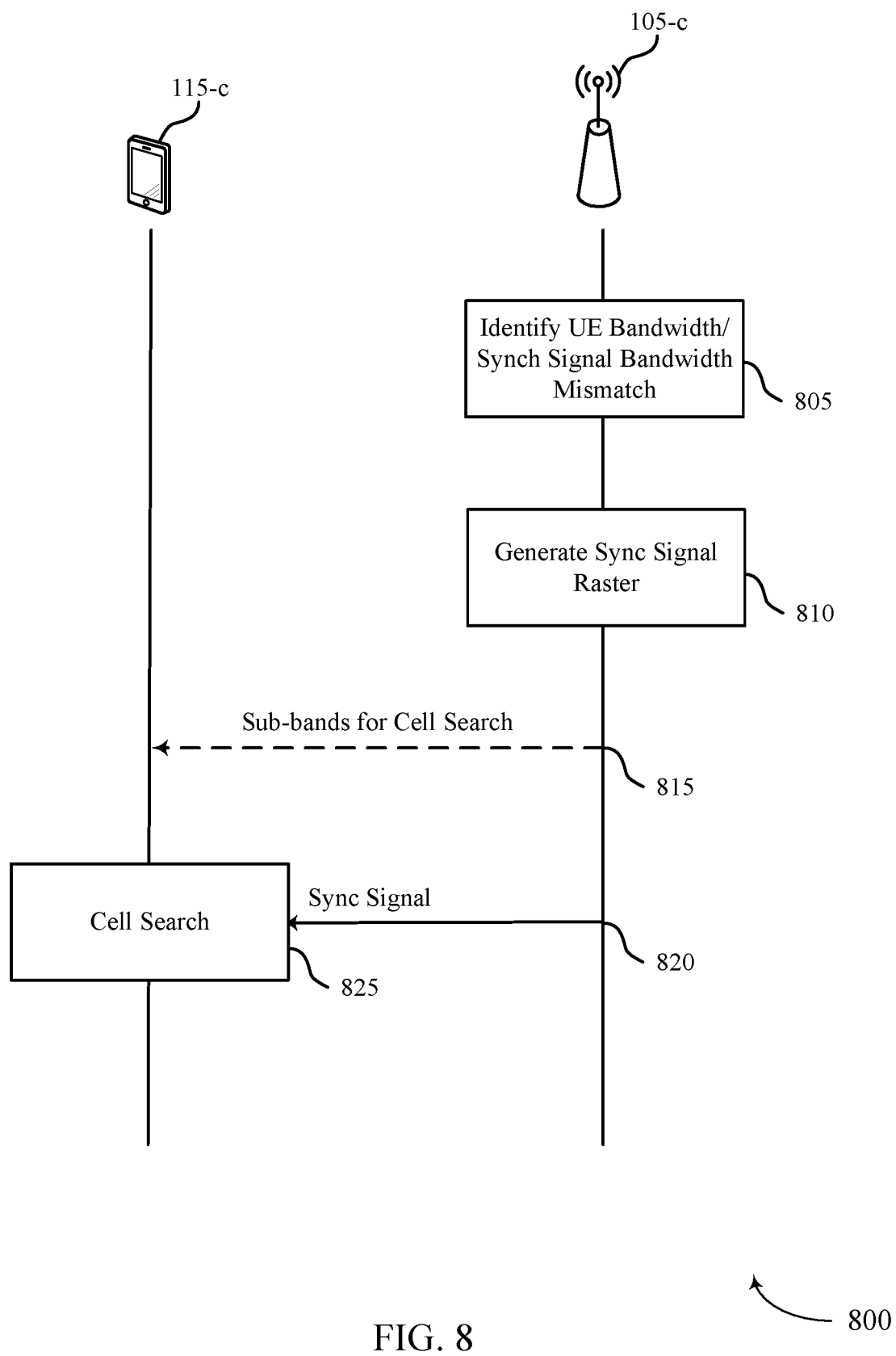

FIG. 8 illustrates an example of a process flow 800 that supports synchronization techniques for UE operation bandwidths less than synchronization signal bandwidths in accordance with various aspects of the present disclosure. Process flow 800 may include a base station 105-c and a UE 115-c, which may represent aspects of techniques performed by a base station 105 or UE 115 as described with reference to FIGS. 1 through 6B.

At step 805, base station 105-c may identify that UE 115-c supports operation with a UE bandwidth less than a synchronization signal bandwidth used by the wireless technology to transmit synchronization signals.

At step 810, base station 105-c may generate a synchronization signal raster based on the UE bandwidth being less than the synchronization signal bandwidth. The raster points may be selected such that each of the subbands searched by UE 115-c (e.g., according to the synchronization signal raster) at least partially overlap with the synchronization signal bandwidth. Further, the overlap may be a predetermined minimum overlap and/or a predetermined portion of the synchronization signal. The predetermined portion of the synchronization signal may be repeated within multiple subbands of the synchronization signal bandwidth corresponding to the raster points. In some cases, the synchronization signal raster may include a subband resolution that is based on the UE bandwidth being less than the synchronization signal bandwidth. In other cases, the synchronization signal raster may include a subband resolution that is greater than a resolution used when the UE bandwidth is at least equal to the synchronization signal bandwidth.

At step 815, base station 105-c may, in some cases, indicate to UE 115-c subbands associated with the synchronization signal raster generated in step 810. At step 820, base station 105-c may transmit one or more synchronization signals. At step 825, UE 115-c may perform a cell search of subbands associated with a synchronization signal raster based at least on the UE bandwidth being less than the synchronization signal bandwidth. As discussed above, the cell search may be limited according to the generated synchronization signal raster (e.g., sub-raster).

In some examples, the UE 115-c may transmit an indication of the received portion of the synchronization signal. The UE 115-c may transmit a message on a RACH determined based at least in part on the received portion of the synchronization signal. For example, the RACH may be determined by the UE 115-c, or may be identified based on an instruction from the base station 105-c.

Figure 9:
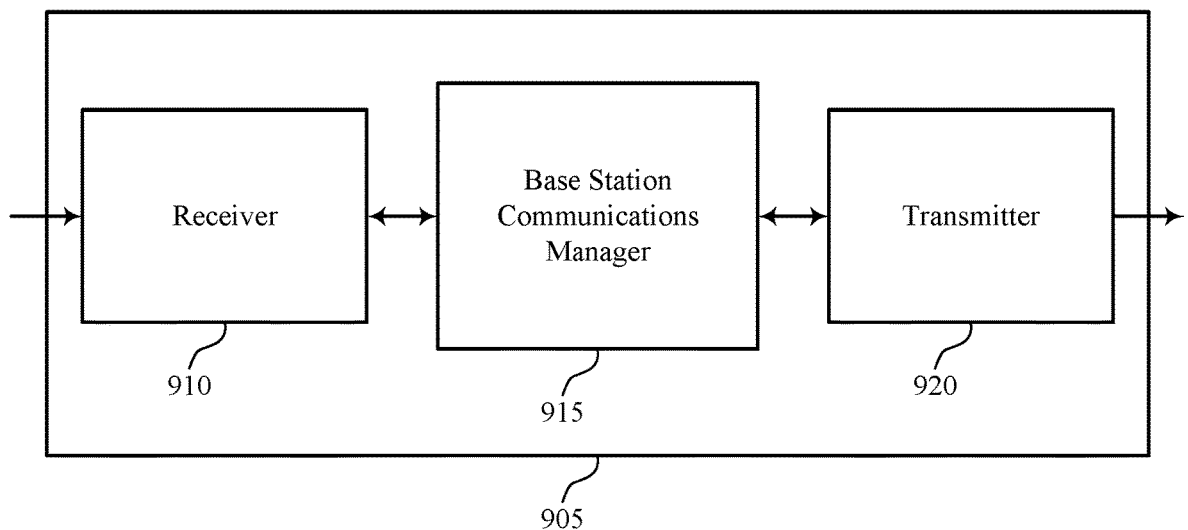
FIGS. 9 through 11 show block diagrams of a device that supports synchronization techniques for UE operation bandwidths less than synchronization signal bandwidths in accordance with aspects of the present disclosure.

FIG. 9 shows a block diagram 900 of a wireless device 905 that supports synchronization techniques for UE operation bandwidths less than synchronization signal bandwidths in accordance with aspects of the present disclosure. Wireless device 905 may be an example of aspects of a base station 105 as described with reference to FIG. 1. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to synchronization techniques for UE operation bandwidths less than synchronization signal bandwidths, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify that a UE supports operation within a UE bandwidth that is less than a synchronization signal bandwidth used by a wireless technology to transmit a synchronization signal. Base station communications manager 915 may then generate a synchronization signal raster based on the UE bandwidth being less than the synchronization signal bandwidth. The base station communications manager 915 may also identify that a wireless network supports narrowband UE operation within a UE bandwidth that is less than a wideband synchronization signal bandwidth used by the wireless technology to transmit a synchronization signal. The base station communications manager 915 may configure the synchronization signal based on the wireless network support of narrowband UE operation, and transmit the synchronization signal in accordance with the configuring.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
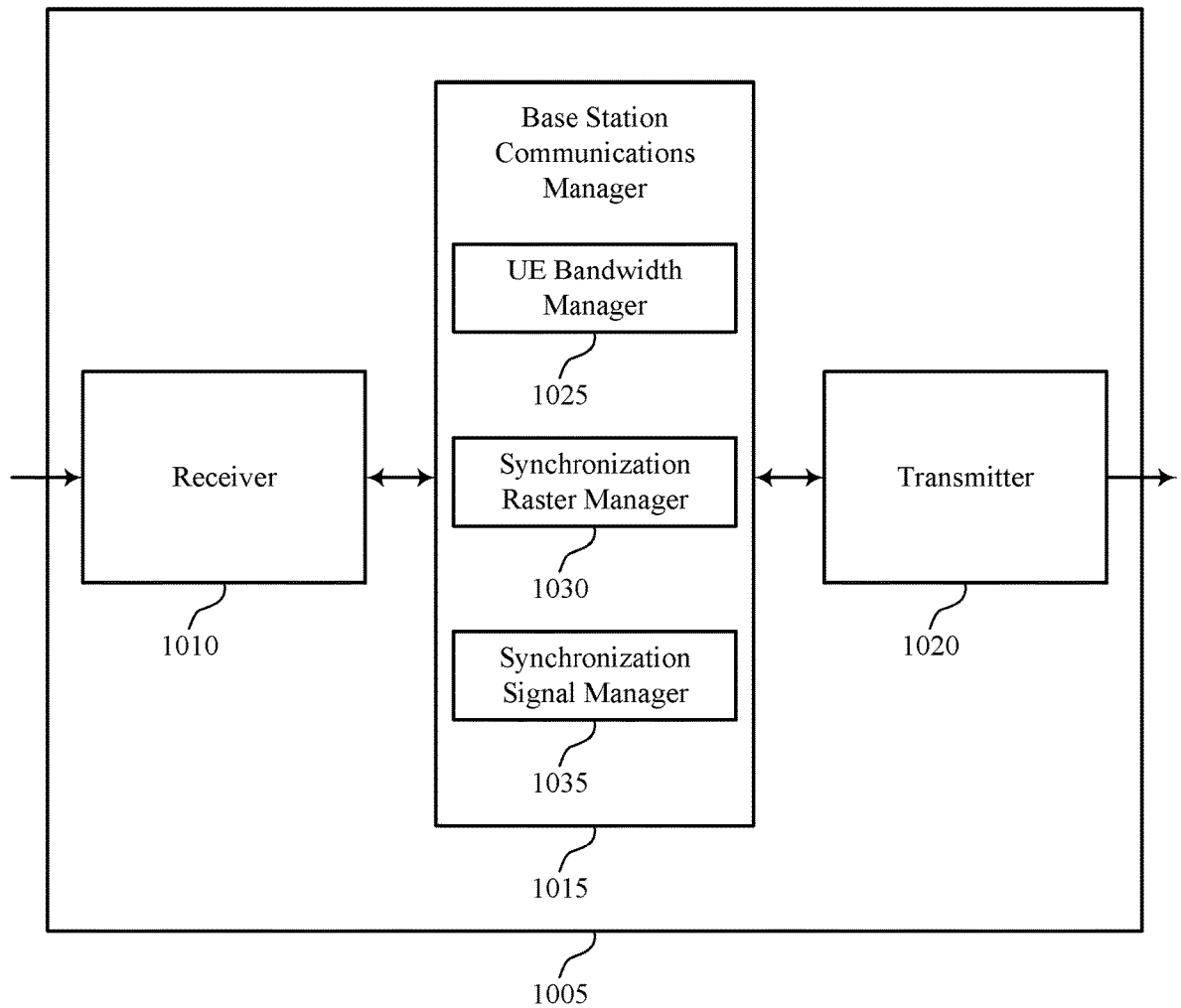

FIG. 10 shows a block diagram 1000 of a wireless device 1005 that supports synchronization techniques for UE operation bandwidths less than synchronization signal bandwidths in accordance with aspects of the present disclosure. Wireless device 1005 may be an example of aspects of a wireless device 905 or a base station 105 as described with reference to FIGS. 1 and 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to synchronization techniques for UE operation bandwidths less than synchronization signal bandwidths, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include UE bandwidth manager 1025, synchronization raster manager 1030, and synchronization signal manager 1035.

UE bandwidth manager 1025 may identify that a UE supports operation within a UE bandwidth that is less than a synchronization signal bandwidth used by a wireless technology to transmit a synchronization signal. UE bandwidth manager 1025 may then identify that a wireless network supports narrowband UE operation within a UE bandwidth that is less than a wideband synchronization signal bandwidth used by the wireless technology to transmit a synchronization signal, and signal that the wireless network supports narrowband UE operation. In some cases, signaling that the wireless network supports narrowband UE operation includes transmitting an indication of narrowband UE support in one or more of a DRS, a RRC message, or a SIB.

Synchronization raster manager 1030 may generate a synchronization signal raster based on the UE bandwidth being less than the synchronization signal bandwidth and offset raster points of the one or more narrowband synchronization signals relative to a raster point of the wideband synchronization signal. In some cases, the synchronization signal raster includes a subband resolution that is based on the UE bandwidth being less than the synchronization signal bandwidth. In some cases, the synchronization signal raster includes a subband resolution that is greater than a resolution used when the UE bandwidth is at least equal to the synchronization signal bandwidth. In some cases, generating the synchronization signal raster includes selecting raster points for the synchronization signal raster such that each of one or more subbands searched by the UE in accordance with the synchronization signal raster at least partially overlap with the synchronization signal bandwidth. In some cases, the one or more subbands each overlap with the synchronization signal bandwidth by a predetermined minimum overlap. In some cases, generating the synchronization signal raster includes selecting raster points for the synchronization signal raster such that each of one or more subbands searched by the UE in accordance with the synchronization signal raster overlap with subbands of the synchronization signal bandwidth that include a predetermined portion of the synchronization signal. In some cases, the predetermined portion of the synchronization signal is repeated within a set of subbands of the synchronization signal bandwidth corresponding to the raster points.

Synchronization signal manager 1035 may configure the synchronization signal based on the wireless network support of narrowband UE operation and transmit the synchronization signal with individual subbands as multiple non-overlapping segments in a second OFDM symbol. Synchronization signal manager 1035 may then configure one or more narrowband synchronization signals in a second OFDM symbol. Synchronization signal manager 1035 may center the one or more narrowband synchronization signals at a same raster point as the wideband synchronization signal. Synchronization signal manager 1035 may transmit the one or more narrowband synchronization signals at a sparsity based on attributes of narrowband UEs supported by the wireless network. Further, Synchronization signal manager 1035 may configure one or more narrowband synchronization signals in the OFDM symbol and transmit the synchronization signal in accordance with the configuring. In some cases, Synchronization signal manager 1035 may concatenate the individual subbands as multiple non-overlapping segments of the synchronization signal and transmit a wideband synchronization signal in a first OFDM symbol. In some cases, configuring the synchronization signal includes configuring a wideband synchronization signal in a first OFDM symbol. In some cases, the one or more narrowband synchronization signals each have a bandwidth that is less than the wideband synchronization signal bandwidth. In some cases, the one or more narrowband synchronization signals include a PSS, a second SSS, a PBCH, or combinations thereof. In some cases, configuring the synchronization signal includes configuring a wideband synchronization signal in an OFDM symbol. In some cases, the predefined subbands include frequencies other than those occupied by the wideband synchronization signal. In some cases, the one or more narrowband synchronization signals each have a bandwidth that is less than the wideband synchronization signal bandwidth. In some cases, the one or more narrowband synchronization signals include a PSS, a SSS, a PBCH, or combinations thereof. In some cases, configuring the synchronization signal includes configuring individual subbands with one or more sequences that are each less than an entirety of the synchronization signal but which, when decoded, convey synchronization information. In some cases, the one or more sequences are PSS sequences and the synchronization information includes a PCI group. In some cases, the one or more sequences are SSS sequences and the synchronization information includes a PCI. In some cases, the multiple non-overlapping segments are repetitions of a same segment. In some cases, configuring one or more narrowband synchronization signals includes: configuring the one or more narrowband synchronization signals at predefined subbands.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
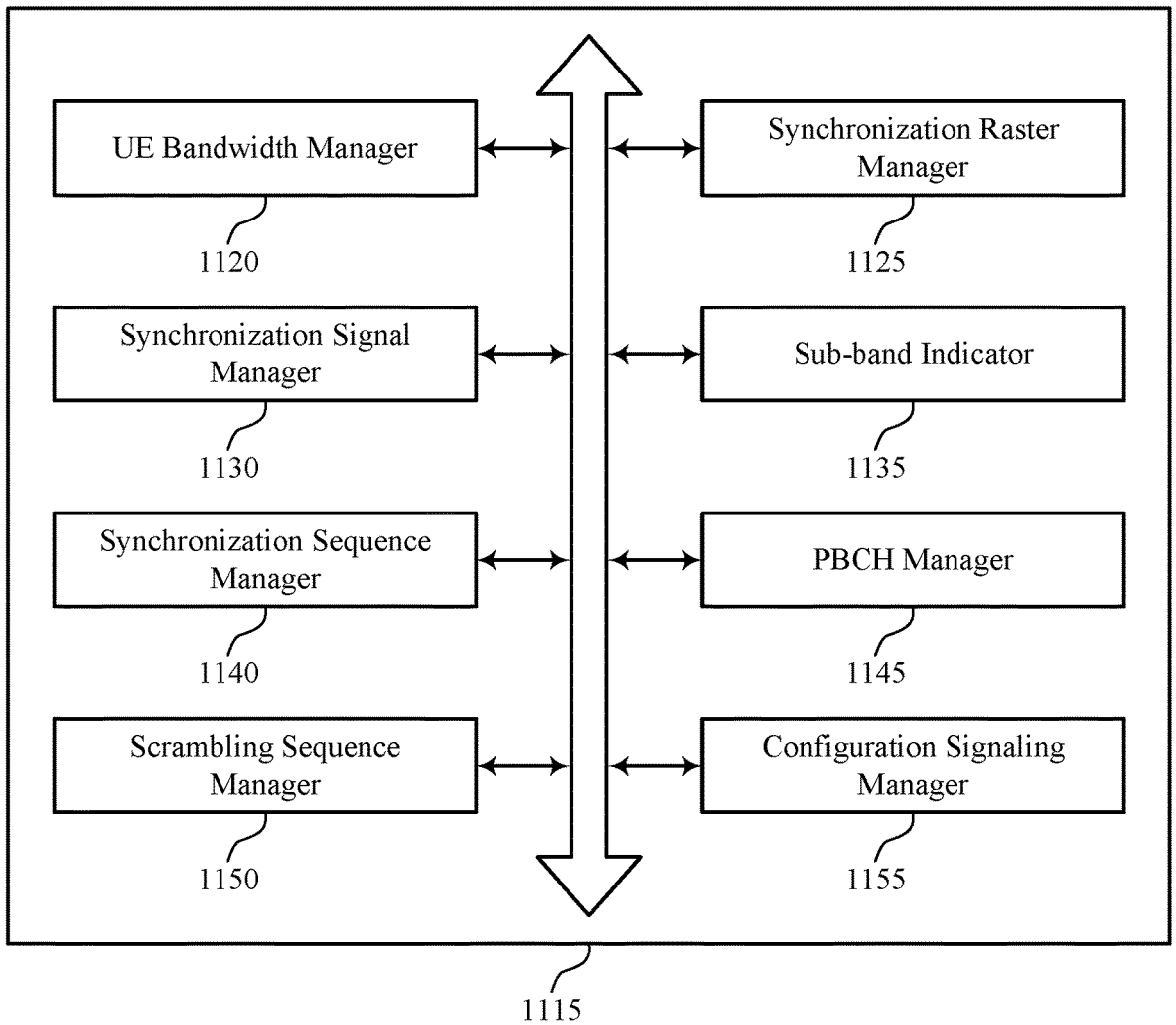

FIG. 11 shows a block diagram 1100 of a base station communications manager 1115 that supports synchronization techniques for UE operation bandwidths less than synchronization signal bandwidths in accordance with aspects of the present disclosure. The base station communications manager 1115 may be an example of aspects of a base station communications manager 915, a base station communications manager 1015, or a base station communications manager 1215 described with reference to FIGS. 9, 10, and 12. The base station communications manager 1115 may include UE bandwidth manager 1120, synchronization raster manager 1125, synchronization signal manager 1130, subband indicator 1135, synchronization sequence manager 1140, PBCH manager 1145, scrambling sequence manager 1150, and configuration signaling manager 1155. Each of these modules may communicate, directly or indirectly, with one another (e.g., via one or more buses).

UE bandwidth manager 1120 may identify that a UE supports operation within a UE bandwidth that is less than a synchronization signal bandwidth used by a wireless technology to transmit a synchronization signal. UE bandwidth manager 1120 may identify that a wireless network supports narrowband UE operation within a UE bandwidth that is less than a wideband synchronization signal bandwidth used by the wireless technology to transmit a synchronization signal and signal that the wireless network supports narrowband UE operation. In some cases, signaling that the wireless network supports narrowband UE operation includes transmitting an indication of narrowband UE support in one or more of a DRS, a RRC message, or a SIB.

Synchronization raster manager 1125 may generate a synchronization signal raster based on the UE bandwidth being less than the synchronization signal bandwidth and offset raster points of the one or more narrowband synchronization signals relative to a raster point of the wideband synchronization signal. In some cases, the synchronization signal raster includes a subband resolution that is based on the UE bandwidth being less than the synchronization signal bandwidth. In some cases, the synchronization signal raster includes a subband resolution that is greater than a resolution used when the UE bandwidth is at least equal to the synchronization signal bandwidth. In some cases, generating the synchronization signal raster includes selecting raster points for the synchronization signal raster such that each of one or more subbands searched by the UE in accordance with the synchronization signal raster at least partially overlap with the synchronization signal bandwidth. In some cases, the one or more subbands each overlap with the synchronization signal bandwidth by a predetermined minimum overlap. In some cases, generating the synchronization signal raster includes selecting raster points for the synchronization signal raster such that each of one or more subbands searched by the UE in accordance with the synchronization signal raster overlap with subbands of the synchronization signal bandwidth that include a predetermined portion of the synchronization signal. In some cases, the predetermined portion of the synchronization signal is repeated within a set of subbands of the synchronization signal bandwidth corresponding to the raster points.

Synchronization signal manager 1130 may configure the synchronization signal based on the wireless network support of narrowband UE operation and transmit the synchronization signal with individual subbands as multiple non-overlapping segments in a second OFDM symbol. In some cases, synchronization signal manager 1130 may configure one or more narrowband synchronization signals in a second OFDM symbol, center the one or more narrowband synchronization signals at a same raster point as the wideband synchronization signal and transmit the one or more narrowband synchronization signals at a sparsity based on attributes of narrowband UEs supported by the wireless network. In some cases, synchronization signal manager 1130 may configure one or more narrowband synchronization signals in the OFDM symbol and transmit the synchronization signal in accordance with the configuring. In some cases, synchronization signal manager 1130 may concatenate the individual subbands as multiple non-overlapping segments of the synchronization signal and transmit a wideband synchronization signal in a first OFDM symbol.

In some cases, configuring the synchronization signal includes configuring a wideband synchronization signal in a first OFDM symbol. In some cases, the one or more narrowband synchronization signals each have a bandwidth that is less than the wideband synchronization signal bandwidth. In some cases, the one or more narrowband synchronization signals include a PSS, a SSS, a PBCH, or combinations thereof. In some cases, configuring the synchronization signal includes configuring a wideband synchronization signal in an OFDM symbol. In some cases, the predefined subbands include frequencies other than those occupied by the wideband synchronization signal. In some cases, the one or more narrowband synchronization signals each have a bandwidth that is less than the wideband synchronization signal bandwidth. In some cases, the one or more narrowband synchronization signals include a PSS, a SSS, a PBCH, or combinations thereof. In some cases, configuring the synchronization signal includes: including, in individual subbands, one or more sequences that are each less than an entirety of the synchronization signal but which, when decoded, convey synchronization information. In some cases, the one or more sequences are PSS sequences and the synchronization information includes a PCI group. In some cases, the one or more sequences are SSS sequences and the synchronization information includes a PCI. In some cases, the multiple non-overlapping segments are repetitions of a same segment. In some cases, configuring one or more narrowband synchronization signals includes: configuring the one or more narrowband synchronization signals at predefined subbands.

Subband indicator 1135 may indicate to the UE that the UE is to perform a cell search of subbands associated with the synchronization signal raster.

Synchronization sequence manager 1140 may configure the synchronization signal to include one or more sequences that are each less than an entirety of the synchronization signal but which, when decoded, convey synchronization information. In some cases, the one or more sequences are PSS sequences and the synchronization information includes a PCI group. In some cases, the one or more sequences are SSS sequences and the synchronization information includes a PCI.

PBCH manager 1145 may transmit a physical broadcast channel (PBCH) in a channel separate from that used for transmitting the synchronization signal in accordance with the configuring.

Scrambling sequence manager 1150 may apply a set of scrambling sequences to the synchronization signal such that individual scrambling sequences are applied to individual subbands and such that individual subbands each include one or more sequences. Each of the individual subbands, when decoded, convey synchronization information. In some cases, the set of scrambling sequences is predetermined. In some cases, the one or more sequences are PSS sequences and the synchronization information includes a PCI group. In some cases, the one or more sequences are SSS sequences and the synchronization information includes a PCI. In some cases, the individual subbands are repetitions of a same segment.

Configuration signaling manager 1155 may transmit a layer 1 signal indicating a configuration of the synchronization signal. In some cases, the layer 1 signal indicates whether the synchronization signal includes a narrowband synchronization signal. In some cases, the layer 1 signal indicates one of multiple locations of the narrowband synchronization signal. In some cases, the layer 1 signal is repeated on multiple subbands.

Figure 12:
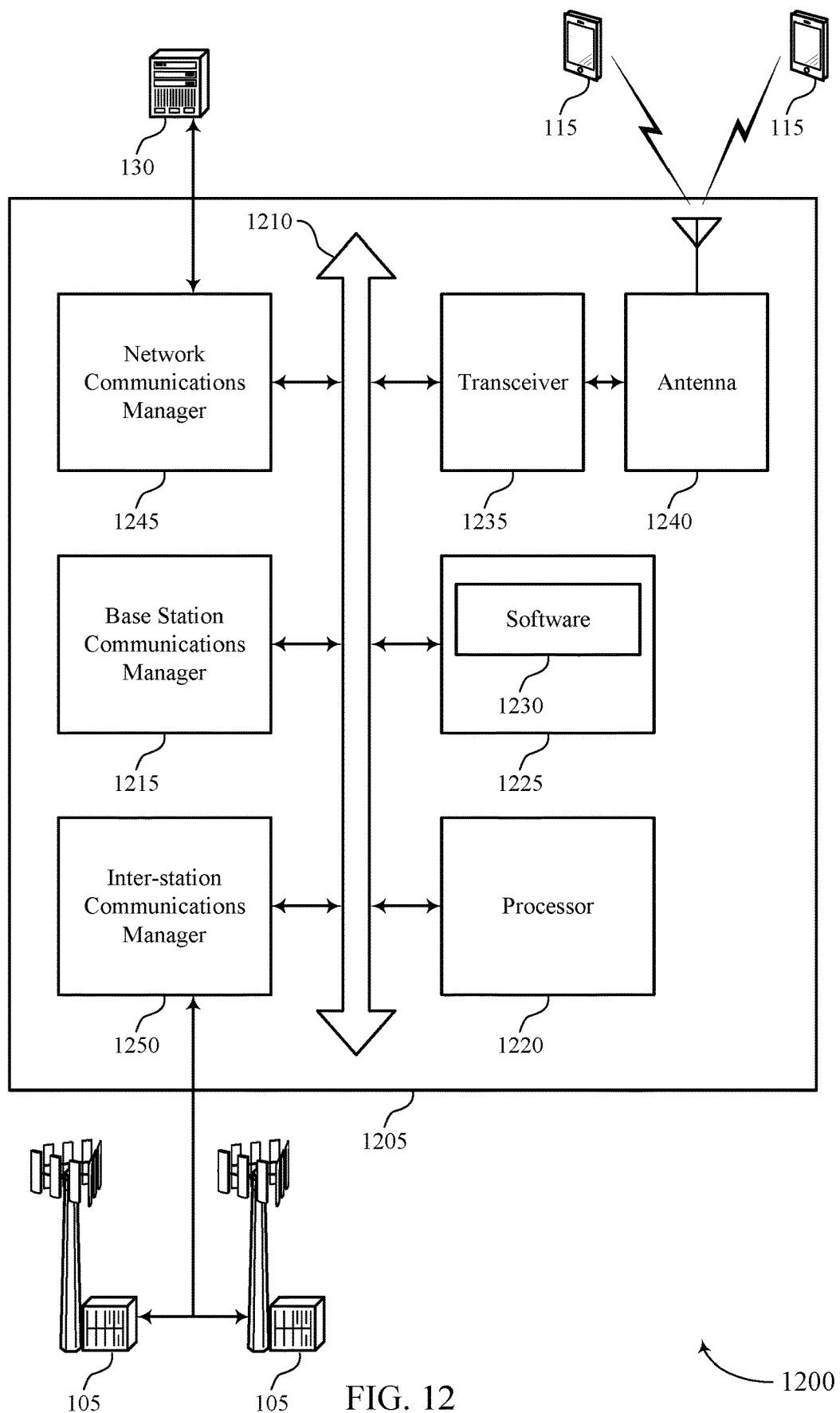
FIG. 12 illustrates a block diagram of a system including a base station that supports synchronization techniques for UE operation bandwidths less than synchronization signal bandwidths in accordance with aspects of the present disclosure.

FIG. 12 shows a diagram of a system 1200 including a device 1205 that supports synchronization techniques for UE operation bandwidths less than synchronization signal bandwidths in accordance with aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting synchronization techniques for UE operation bandwidths less than synchronization signal bandwidths).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support synchronization techniques for UE operation bandwidths less than synchronization signal bandwidths. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
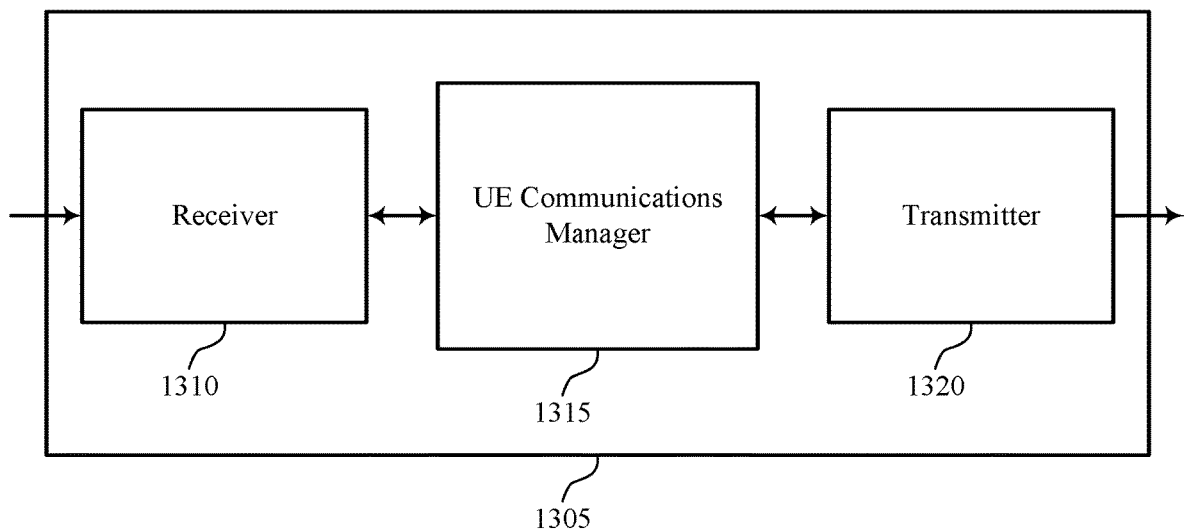
FIGS. 13 through 15 show block diagrams of a device that supports synchronization techniques for UE operation bandwidths less than synchronization signal bandwidths in accordance with aspects of the present disclosure.

FIG. 13 shows a block diagram 1300 of a wireless device 1305 that supports synchronization techniques for UE operation bandwidths less than synchronization signal bandwidths in accordance with aspects of the present disclosure. Wireless device 1305 may be an example of aspects of a UE 115 as described with reference to FIG. 1. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to synchronization techniques for UE operation bandwidths less than synchronization signal bandwidths, etc.). Information may be passed on to other components of the device. The receiver 1310 may be an example of aspects of the transceiver 1635 described with reference to FIG. 16. The receiver 1310 may utilize a single antenna or a set of antennas.

UE communications manager 1315 may be an example of aspects of the UE communications manager 1615 described with reference to FIG. 16. UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1315 and/or at least some of its various sub-components may be physically located at various positions, including being distributed such that portions of functions are implemented at different physical locations by one or more physical devices. In some examples, UE communications manager 1315 and/or at least some of its various sub-components may be a separate and distinct component in accordance with various aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1315 may identify that a UE supports operation within a UE bandwidth that is less than a synchronization signal bandwidth used by a wireless technology to transmit a synchronization signal and perform a cell search of subbands associated with a synchronization signal raster based on the UE bandwidth being less than the synchronization signal bandwidth. The UE communications manager 1315 may also operate a UE in a wireless network that supports narrowband UE operation for a UE bandwidth that is less than a wideband synchronization signal bandwidth and receive a synchronization signal that has been configured based on the wireless network support of narrowband UE operation.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
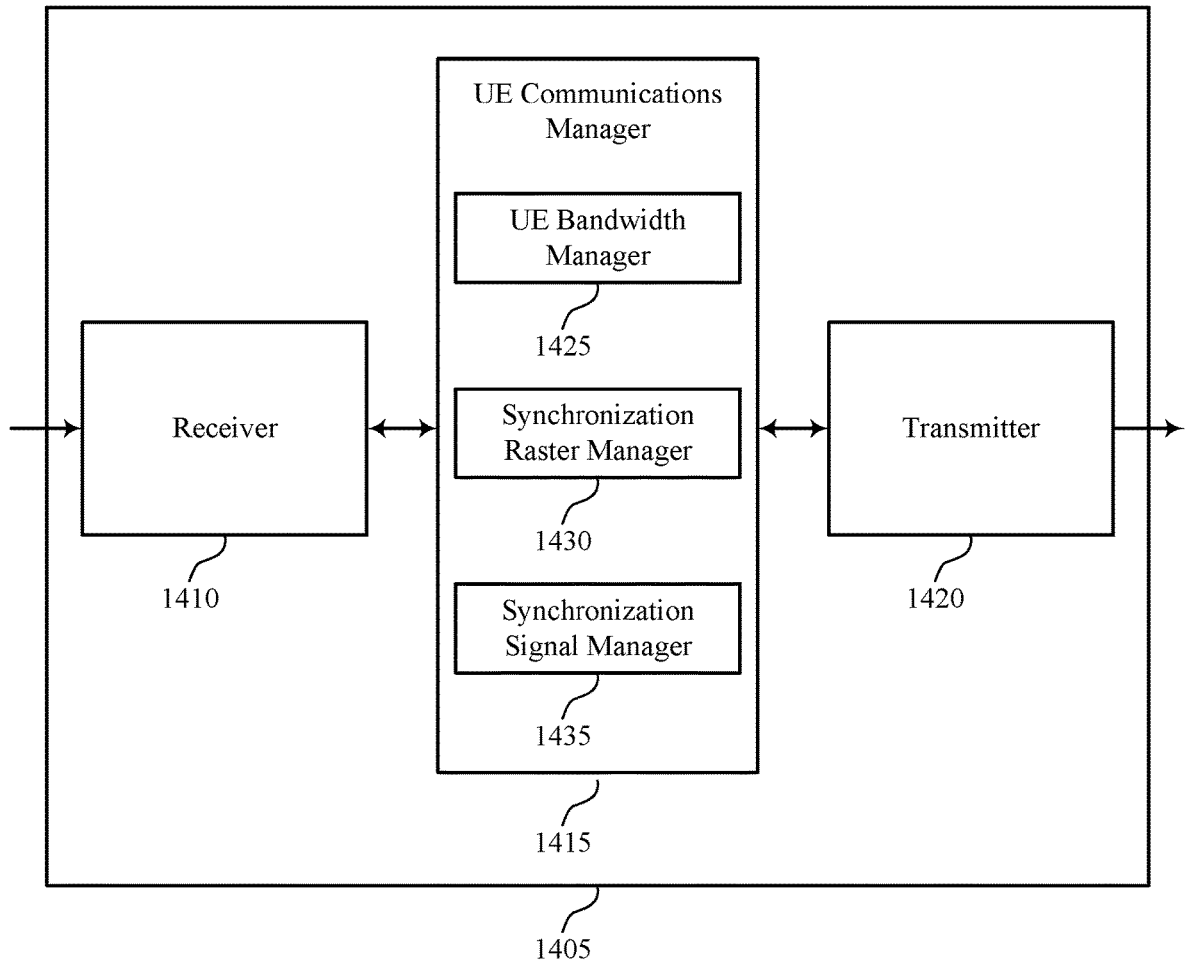

FIG. 14 shows a block diagram 1400 of a wireless device 1405 that supports synchronization techniques for UE operation bandwidths less than synchronization signal bandwidths in accordance with aspects of the present disclosure. Wireless device 1405 may be an example of aspects of a wireless device 1305 or a UE 115 as described with reference to FIGS. 1 and 13. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to synchronization techniques for UE operation bandwidths less than synchronization signal bandwidths, etc.). Information may be passed on to other components of the device. The receiver 1410 may be an example of aspects of the transceiver 1635 described with reference to FIG. 16. The receiver 1410 may utilize a single antenna or a set of antennas.

UE communications manager 1415 may be an example of aspects of the UE communications manager 1615 described with reference to FIG. 16. UE communications manager 1415 may also include UE bandwidth manager 1425, synchronization raster manager 1430, and synchronization signal manager 1435.

UE bandwidth manager 1425 may identify that a UE supports operation within a UE bandwidth that is less than a synchronization signal bandwidth used by a wireless technology to transmit a synchronization signal. Further. UE bandwidth manager 1425 may operate a UE in a wireless network that supports narrowband UE operation for a UE bandwidth that is less than a wideband synchronization signal bandwidth, and receive a signal that the wireless network supports narrowband UE operation. In some cases, receiving the signal that the wireless network supports narrowband UE operation includes receiving an indication of narrowband UE support in one or more of a DRS, a RRC message, or a SIB.

Synchronization raster manager 1430 may perform a cell search of subbands associated with a synchronization signal raster based on the UE bandwidth being less than the synchronization signal bandwidth. In some cases, the synchronization signal raster includes a subband resolution that is based on the UE bandwidth being less than the synchronization signal bandwidth. In some cases, the synchronization signal raster includes a subband resolution that is greater than a resolution used when the UE bandwidth is at least equal to the synchronization signal bandwidth. In some cases, performing the cell search of subbands includes: limiting the cell search to a search of one or more subbands associated with the raster definition. In some cases, performing the cell search of subbands includes: limiting the cell search to a search of one or more subbands that at least partially overlap with the synchronization signal bandwidth. In some cases, the one or more subbands each overlap with the synchronization signal bandwidth by a predetermined minimum overlap. In some cases, performing the cell search of subbands includes: limiting the cell search to a search of one or more subbands that each overlap with a predetermined portion of the synchronization signal. In some cases, the predetermined portion of the synchronization signal is repeated within a set of subbands of the synchronization signal bandwidth corresponding to the one or more subbands of the synchronization signal raster.

Synchronization signal manager 1435 may receive a synchronization signal that has been configured based on the wireless network support of narrowband UE operation and blindly detect the one or more narrowband synchronization signals in order to determine whether narrowband UEs are present. Synchronization signal manager 1435 may receive one or more narrowband synchronization signals in a second OFDM symbol and receive the one or more narrowband synchronization signals at a sparsity based on attributes of narrowband UEs supported by the wireless network. Synchronization signal manager 1435 may jointly detect the wideband synchronization signal and the one or more narrowband synchronization signals and receive one or more narrowband synchronization signals in the OFDM symbol. In some cases, the one or more narrowband synchronization signals each have a bandwidth that is less than the wideband synchronization signal bandwidth. In some cases, the one or more narrowband synchronization signals include a PSS, a SSS, a PBCH, or combinations thereof. In some cases, the one or more narrowband synchronization signals are centered at a same raster point as the wideband synchronization signal. In some cases, the one or more narrowband synchronization signals include raster points that are offset relative to a raster point of the wideband synchronization signal. In some cases, receiving the synchronization signal includes receiving a wideband synchronization signal in a first OFDM symbol. In some cases, receiving the synchronization signal includes receiving a wideband synchronization signal in an OFDM symbol. In some cases, the UE is a narrowband UE and is scheduled to operate at predefined subbands corresponding to subbands on which the one or more narrowband synchronization signals are transmitted. In some cases, the predefined subbands include frequencies other than those occupied by the wideband synchronization signal. In some cases, the UE is a narrowband UE and is configured to blindly search for subbands on which the one or more narrowband synchronization signals are transmitted. In some cases, the one or more narrowband synchronization signals each have a bandwidth that is less than the wideband synchronization signal bandwidth. In some cases, the one or more narrowband synchronization signals include a PSS, a SSS, a PBCH, or combinations thereof.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
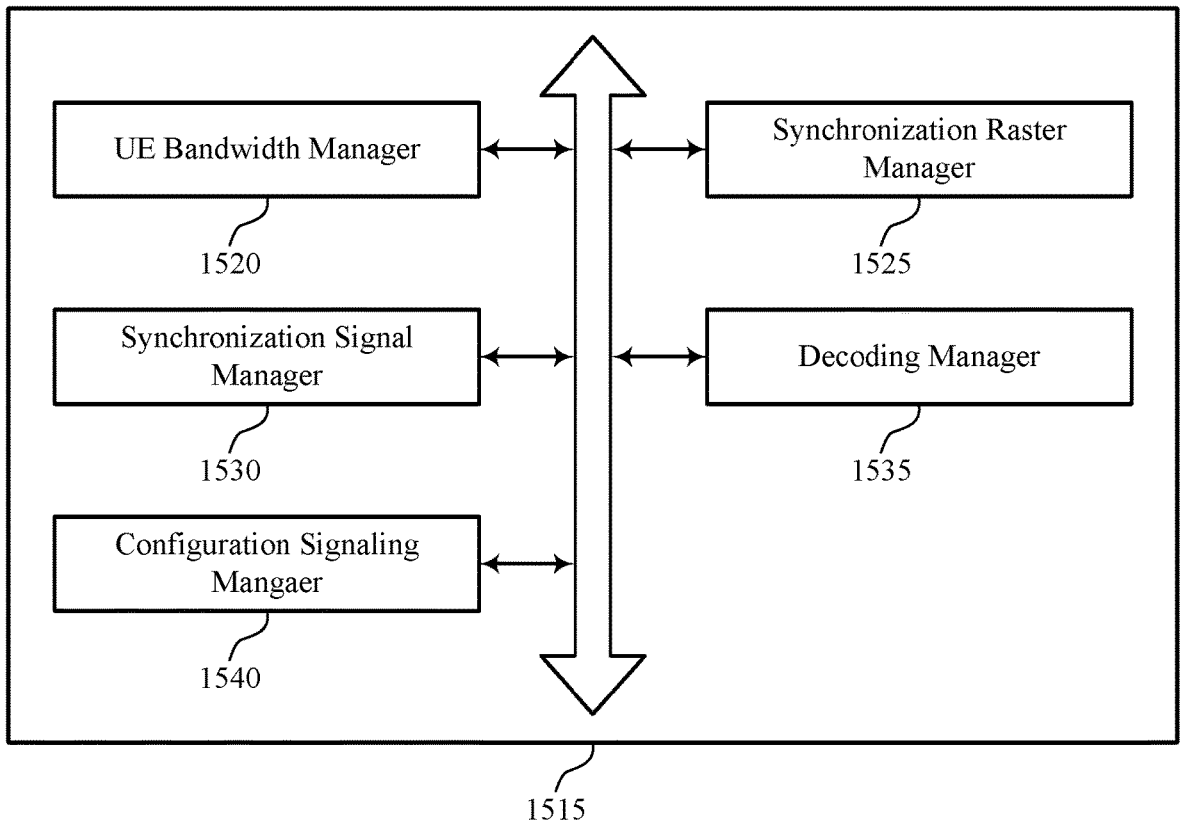

FIG. 15 shows a block diagram 1500 of a UE communications manager 1515 that supports synchronization techniques for UE operation bandwidths less than synchronization signal bandwidths in accordance with aspects of the present disclosure. The UE communications manager 1515 may be an example of aspects of a UE communications manager 1615 described with reference to FIGS. 13, 14, and 16. The UE communications manager 1515 may include UE bandwidth manager 1520, synchronization raster manager 1525, synchronization signal manager 1530, decoding manager 1535, and configuration signaling manager 1540. Each of these modules may communicate, directly or indirectly, with one another (e.g., via one or more buses).

UE bandwidth manager 1520 may identify that a UE supports operation within a UE bandwidth that is less than a synchronization signal bandwidth used by a wireless technology to transmit a synchronization signal. UE bandwidth manager 1520 may operate a UE in a wireless network that supports narrowband UE operation for a UE bandwidth that is less than a wideband synchronization signal bandwidth and receive a signal that the wireless network supports narrowband UE operation. In some cases, receiving the signal that the wireless network supports narrowband UE operation includes: receiving an indication of narrowband UE support in one or more of a DRS, a RRC message, or a SIB.

Synchronization raster manager 1525 may perform a cell search of subbands associated with a synchronization signal raster based on the UE bandwidth being less than the synchronization signal bandwidth. In some cases, the synchronization signal raster includes a subband resolution that is based on the UE bandwidth being less than the synchronization signal bandwidth. In some cases, the synchronization signal raster includes a subband resolution that is greater than a resolution used when the UE bandwidth is at least equal to the synchronization signal bandwidth. In some cases, performing the cell search of subbands includes: limiting the cell search to a search of one or more subbands associated with the raster definition. In some cases, performing the cell search of subbands includes limiting the cell search to a search of one or more subbands that at least partially overlap with the synchronization signal bandwidth. In some cases, the one or more subbands each overlap with the synchronization signal bandwidth by a predetermined minimum overlap. In some cases, performing the cell search of subbands includes limiting the cell search to a search of one or more subbands that each overlap with a predetermined portion of the synchronization signal. In some cases, the predetermined portion of the synchronization signal is repeated within a set of subbands of the synchronization signal bandwidth corresponding to the one or more subbands of the synchronization signal raster.

Synchronization signal manager 1530 may receive a synchronization signal that has been configured based on the wireless network support of narrowband UE operation. Synchronization signal manager 1530 may blindly detect the one or more narrowband synchronization signals in order to determine whether narrowband UEs are present and receive one or more narrowband synchronization signals in a second OFDM symbol. Synchronization signal manager 1530 may receive the one or more narrowband synchronization signals at a sparsity based on attributes of narrowband UEs supported by the wireless network. Synchronization signal manager 1530 may jointly detect the wideband synchronization signal and the one or more narrowband synchronization signals and receive one or more narrowband synchronization signals in the OFDM symbol. In some cases, the one or more narrowband synchronization signals each have a bandwidth that is less than the wideband synchronization signal bandwidth. In some cases, the one or more narrowband synchronization signals include a PSS, a SSS, a PBCH, or combinations thereof. In some cases, the one or more narrowband synchronization signals are centered at a same raster point as the wideband synchronization signal. In some cases, the one or more narrowband synchronization signals include raster points that are offset relative to a raster point of the wideband synchronization signal. In some cases, receiving the synchronization signal includes receiving a wideband synchronization signal in a first OFDM symbol. In some cases, receiving the synchronization signal includes receiving a wideband synchronization signal in an OFDM symbol. In some cases, the UE is a narrowband UE and is scheduled to operate at predefined subbands corresponding to subbands on which the one or more narrowband synchronization signals are transmitted. In some cases, the predefined subbands include frequencies other than those occupied by the wideband synchronization signal. In some cases, the UE is a narrowband UE and is configured to blindly search for subbands on which the one or more narrowband synchronization signals are transmitted. In some cases, the one or more narrowband synchronization signals each have a bandwidth that is less than the wideband synchronization signal bandwidth. In some cases, the one or more narrowband synchronization signals include a PSS, a SSS, a PBCH, or combinations thereof.

Decoding manager 1535 may receive a PBCH in a channel separate from that used for receiving the synchronization signal. In some cases, receiving the synchronization signal includes decoding one or more sequences of the synchronization signal from one or more individual subbands of the wideband synchronization signal bandwidth, each of the one or more sequences being less than an entirety of the synchronization signal but conveying synchronization information. In some cases, the one or more sequences are PSS sequences and the synchronization information includes a PCI group. In some cases, the one or more sequences are SSS sequences and the synchronization information includes a PCI. In some cases, the one or more individual subbands are each scrambled using separate scrambling sequences. In some cases, a mapping of scrambling sequences to individual subbands is predetermined.

Configuration signaling manager 1540 may receive a layer 1 signal indicating a configuration of the synchronization signal. In some cases, the layer 1 signal indicates whether the synchronization signal includes a narrowband synchronization signal. In some cases, the layer 1 signal indicates one of multiple locations of the narrowband synchronization signal. In some cases, the layer 1 signal is repeated on multiple subbands.

Figure 16:
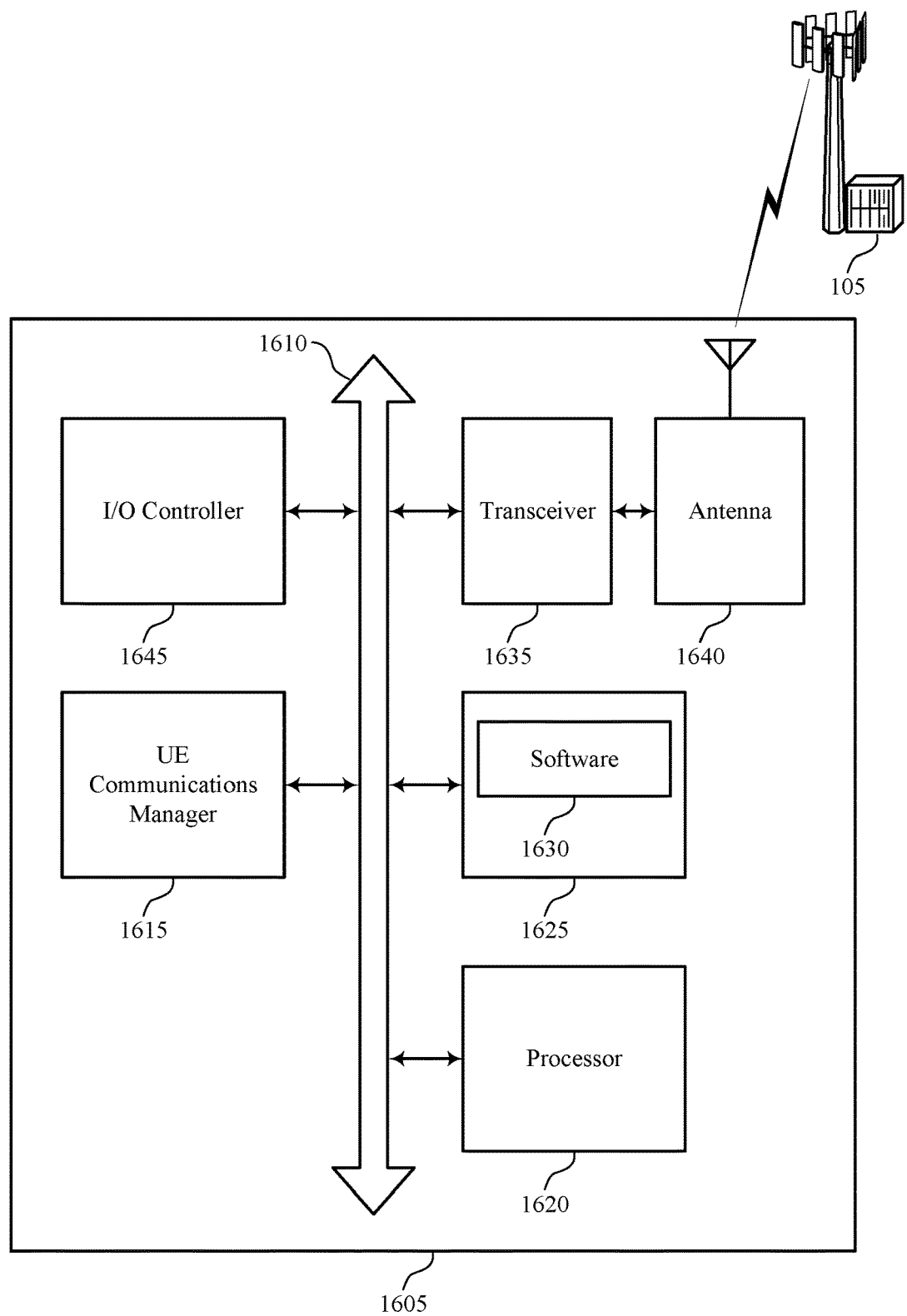
FIG. 16 illustrates a block diagram of a system including a UE that supports synchronization techniques for UE operation bandwidths less than synchronization signal bandwidths in accordance with aspects of the present disclosure.

FIG. 16 shows a diagram of a system 1600 including a device 1605 that supports synchronization techniques for UE operation bandwidths less than synchronization signal bandwidths in accordance with aspects of the present disclosure. Device 1605 may be an example of or include the components of UE 115 as described above, e.g., with reference to FIG. 1. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more busses (e.g., bus 1610). Device 1605 may communicate wirelessly with one or more base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting synchronization techniques for UE operation bandwidths less than synchronization signal bandwidths).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support synchronization techniques for UE operation bandwidths less than synchronization signal bandwidths. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
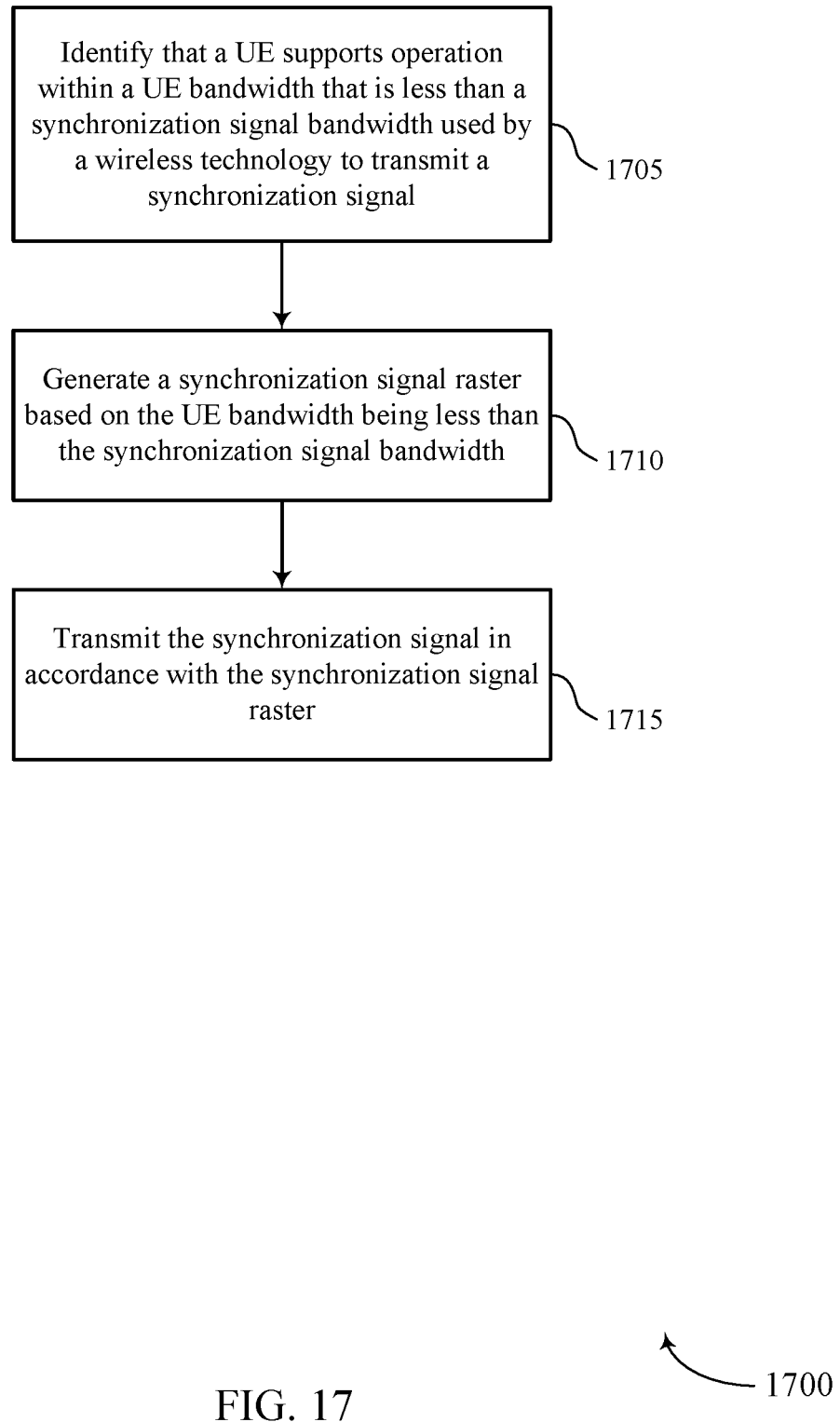
FIGS. 17 through 22 illustrate methods for synchronization techniques for UE operation bandwidths less than synchronization signal bandwidths in accordance with aspects of the present disclosure.

FIG. 17 shows a flowchart illustrating a method 1700 for synchronization techniques for UE operation bandwidths less than synchronization signal bandwidths in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify that a user equipment (UE) supports operation within a UE bandwidth that is less than a synchronization signal bandwidth used by a wireless technology to transmit a synchronization signal. The operations of block 1705 may be performed according to the methods described with reference to FIGS. 1 through 8. In certain examples, aspects of the operations of block 1705 may be performed by a UE bandwidth manager as described with reference to FIGS. 9 through 12.

At block 1710 the base station 105 may generate a synchronization signal raster based at least in part on the UE bandwidth being less than the synchronization signal bandwidth. The operations of block 1710 may be performed according to the methods described with reference to FIGS. 1 through 8. In certain examples, aspects of the operations of block 1710 may be performed by a synchronization raster manager as described with reference to FIGS. 9 through 12.

At block 1715 the base station 105 may transmit the synchronization signal in accordance with the synchronization signal raster. The operations of block 1715 may be performed according to the methods described with reference to FIGS. 1 through 8. In certain examples, aspects of the operations of block 1715 may be performed by a synchronization signal manager as described with reference to FIGS. 9 through 12.

Figure 18:
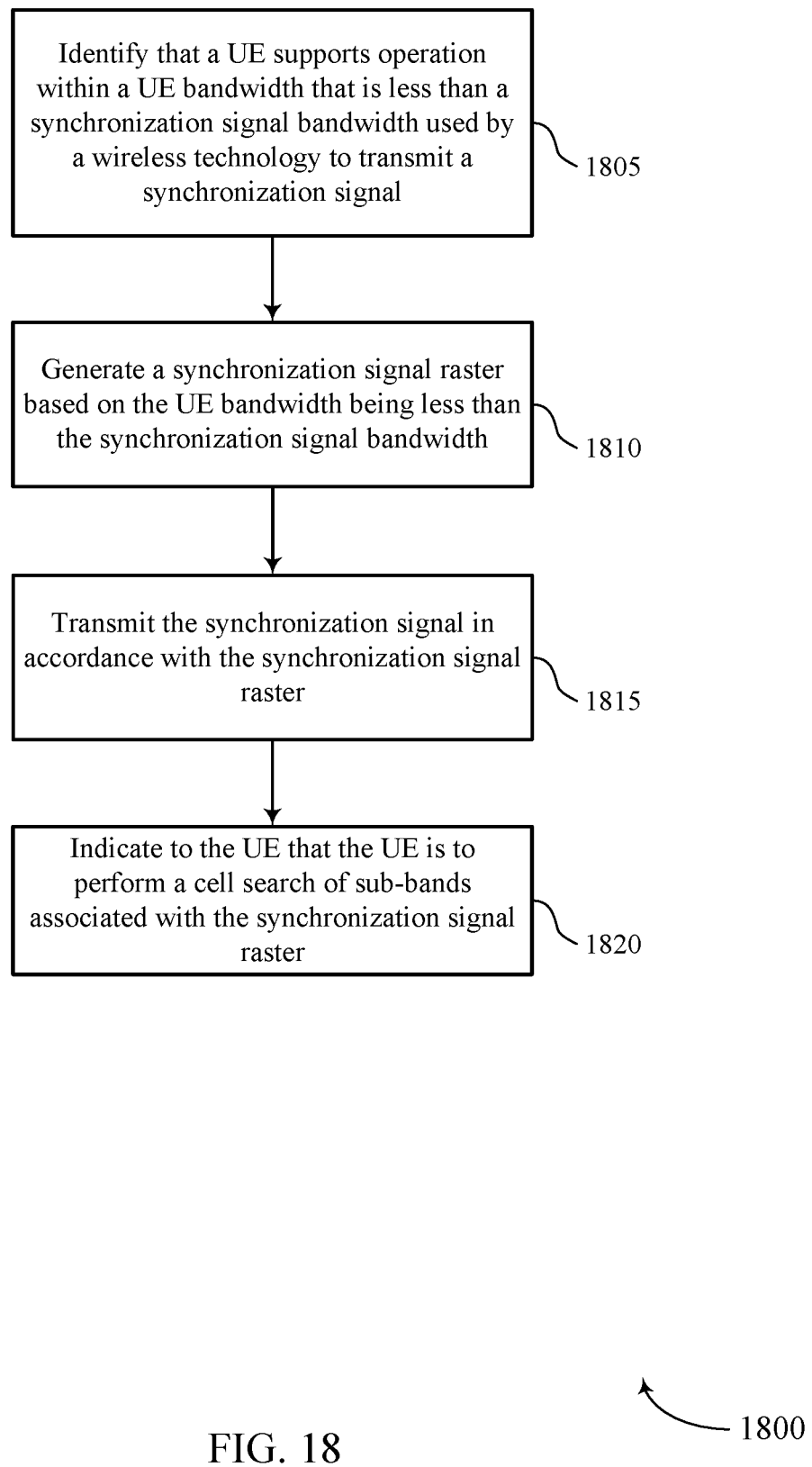

FIG. 18 shows a flowchart illustrating a method 1800 for synchronization techniques for UE operation bandwidths less than synchronization signal bandwidths in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify that a user equipment (UE) supports operation within a UE bandwidth that is less than a synchronization signal bandwidth used by a wireless technology to transmit a synchronization signal. The operations of block 1805 may be performed according to the methods described with reference to FIGS. 1 through 8. In certain examples, aspects of the operations of block 1805 may be performed by a UE bandwidth manager as described with reference to FIGS. 9 through 12.

At block 1810 the base station 105 may generate a synchronization signal raster based at least in part on the UE bandwidth being less than the synchronization signal bandwidth. The operations of block 1810 may be performed according to the methods described with reference to FIGS. 1 through 8. In certain examples, aspects of the operations of block 1810 may be performed by a synchronization raster manager as described with reference to FIGS. 9 through 12.

At block 1815 the base station 105 may transmit the synchronization signal in accordance with the synchronization signal raster. The operations of block 1815 may be performed according to the methods described with reference to FIGS. 1 through 8. In certain examples, aspects of the operations of block 1815 may be performed by a synchronization signal manager as described with reference to FIGS. 9 through 12.

At block 1820 the base station 105 may indicate to the UE that the UE is to perform a cell search of subbands associated with the synchronization signal raster. The operations of block 1820 may be performed according to the methods described with reference to FIGS. 1 through 8. In certain examples, aspects of the operations of block 1820 may be performed by a subband indicator as described with reference to FIGS. 9 through 12.

Figure 19:
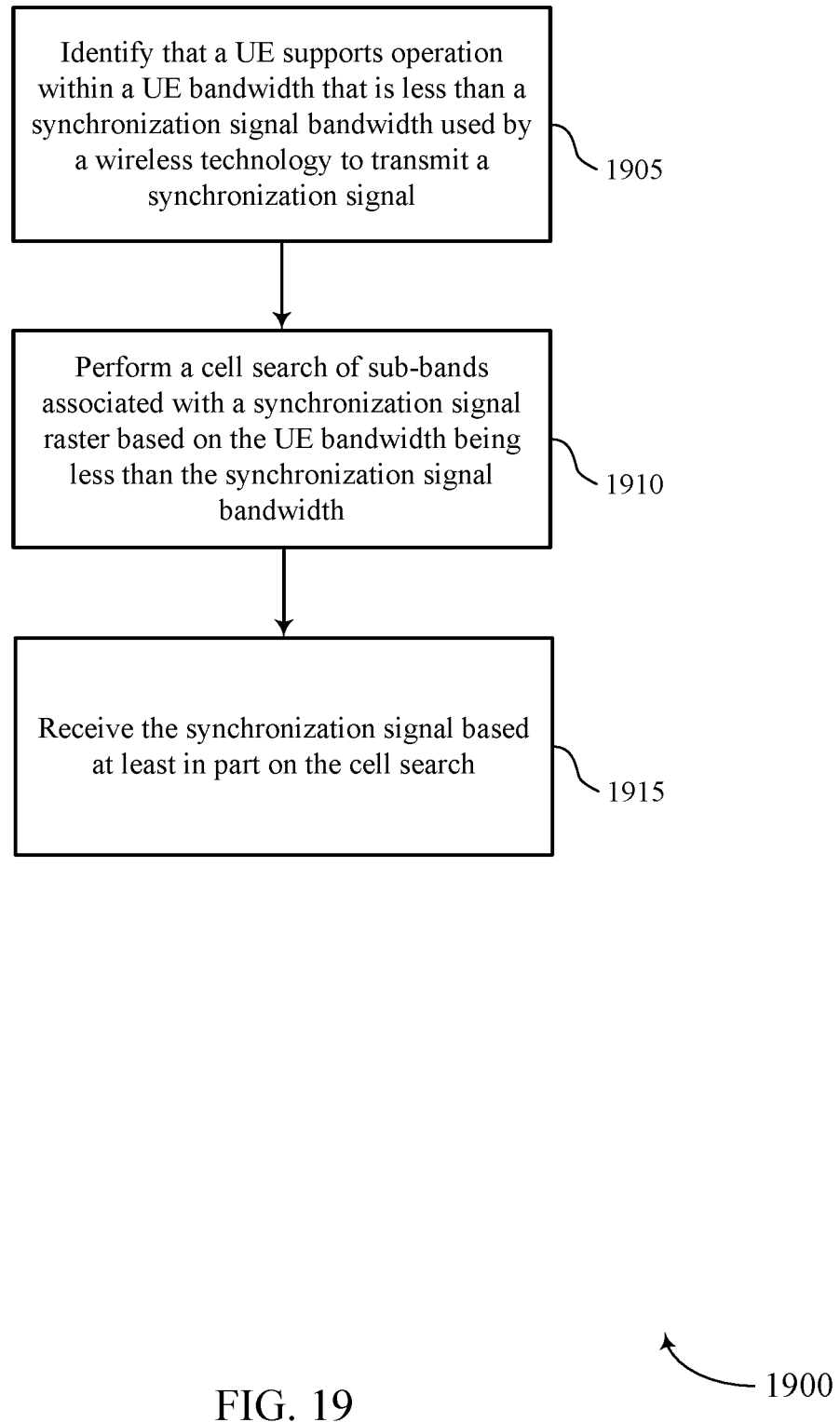

FIG. 19 shows a flowchart illustrating a method 1900 for synchronization techniques for UE operation bandwidths less than synchronization signal bandwidths in accordance with aspects of the present disclosure. The operations of method 1900 may be implemented by a UE 115 or its components as described herein. For example, the operations of method 1900 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify that a user equipment (UE) supports operation within a UE bandwidth that is less than a synchronization signal bandwidth used by a wireless technology to transmit a synchronization signal. The operations of block 1905 may be performed according to the methods described with reference to FIGS. 1 through 8. In certain examples, aspects of the operations of block 1905 may be performed by a UE bandwidth manager as described with reference to FIGS. 13 through 16.

At block 1910 the UE 115 may perform a cell search of subbands associated with a synchronization signal raster based at least in part on the UE bandwidth being less than the synchronization signal bandwidth. The operations of block 1910 may be performed according to the methods described with reference to FIGS. 1 through 8. In certain examples, aspects of the operations of block 1910 may be performed by a synchronization raster manager as described with reference to FIGS. 13 through 16.

At block 1915 the UE 115 may receive the synchronization signal based at least in part on the cell search. The operations of block 1915 may be performed according to the methods described with reference to FIGS. 1 through 8. In certain examples, aspects of the operations of block 1915 may be performed by a synchronization signal manager as described with reference to FIGS. 13 through 16.

Figure 20:
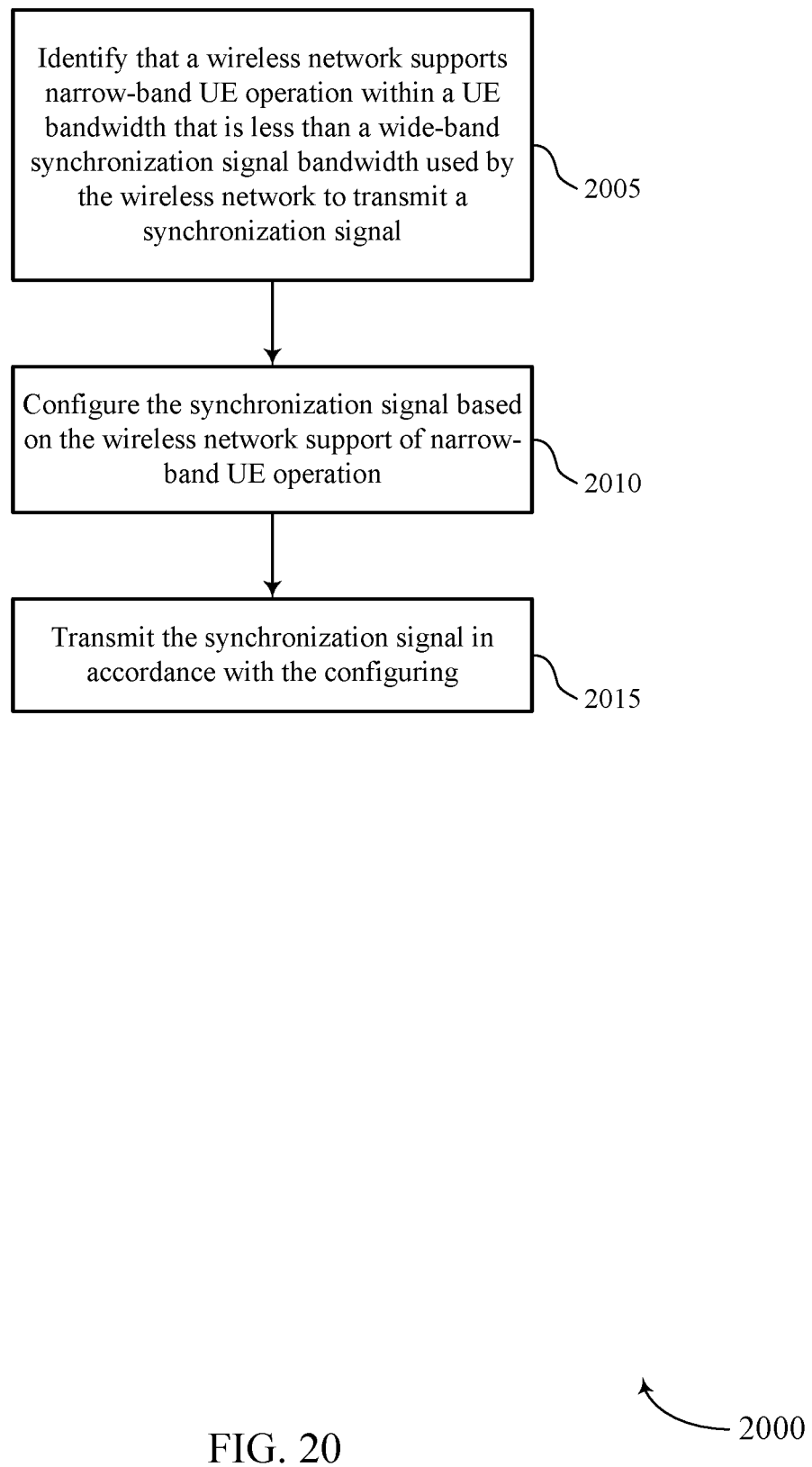

FIG. 20 shows a flowchart illustrating a method 2000 for synchronization techniques for UE operation bandwidths less than synchronization signal bandwidths in accordance with aspects of the present disclosure. The operations of method 2000 may be implemented by a base station 105 or its components as described herein. For example, the operations of method 2000 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify that a wireless network supports narrowband user equipment (UE) operation within a UE bandwidth that is less than a wideband synchronization signal bandwidth used by the wireless network to transmit a synchronization signal. The operations of block 2005 may be performed according to the methods described with reference to FIGS. 1 through 8. In certain examples, aspects of the operations of block 2005 may be performed by a UE bandwidth manager as described with reference to FIGS. 9 through 12.

At block 2010 the base station 105 may configure the synchronization signal based at least in part on the wireless network support of narrowband UE operation. The operations of block 2010 may be performed according to the methods described with reference to FIGS. 1 through 8. In certain examples, aspects of the operations of block 2010 may be performed by a synchronization signal manager as described with reference to FIGS. 9 through 12.

At block 2015 the base station 105 may transmit the synchronization signal in accordance with the configuring. The operations of block 2015 may be performed according to the methods described with reference to FIGS. 1 through 8. In certain examples, aspects of the operations of block 2015 may be performed by a synchronization signal manager as described with reference to FIGS. 9 through 12.

Figure 21:
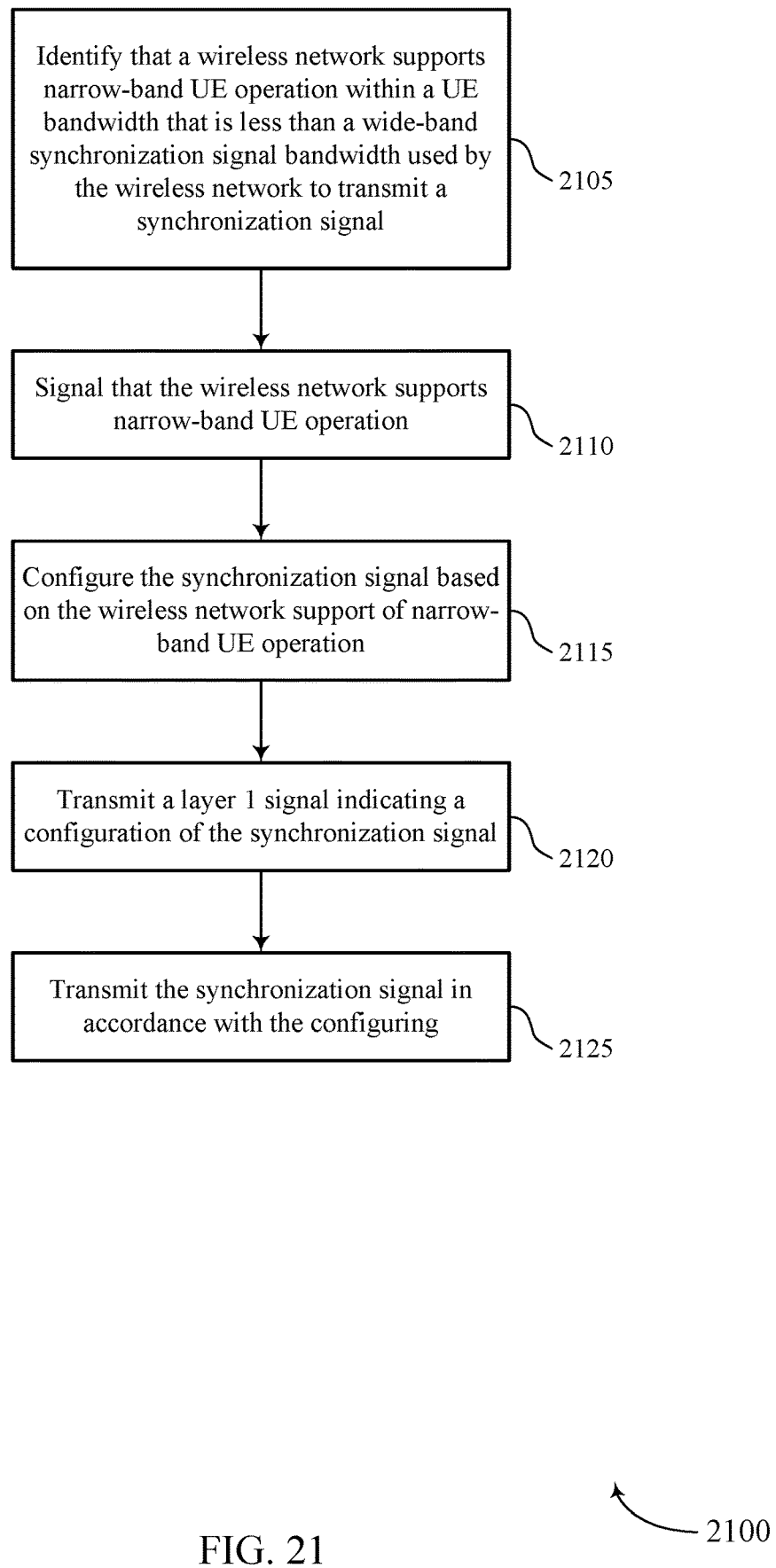

FIG. 21 shows a flowchart illustrating a method 2100 for synchronization techniques for UE operation bandwidths less than synchronization signal bandwidths in accordance with aspects of the present disclosure. The operations of method 2100 may be implemented by a base station 105 or its components as described herein. For example, the operations of method 2100 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may identify that a wireless network supports narrowband user equipment (UE) operation within a UE bandwidth that is less than a wideband synchronization signal bandwidth used by the wireless network to transmit a synchronization signal. The operations of block 2105 may be performed according to the methods described with reference to FIGS. 1 through 8. In certain examples, aspects of the operations of block 2105 may be performed by a UE bandwidth manager as described with reference to FIGS. 9 through 12.

At block 2110 the base station 105 may signal that the wireless network supports narrowband UE operation. The operations of block 2110 may be performed according to the methods described with reference to FIGS. 1 through 8. In certain examples, aspects of the operations of block 2110 may be performed by a UE bandwidth manager as described with reference to FIGS. 9 through 12.

At block 2115 the base station 105 may configure the synchronization signal based at least in part on the wireless network support of narrowband UE operation. The operations of block 2115 may be performed according to the methods described with reference to FIGS. 1 through 8. In certain examples, aspects of the operations of block 2115 may be performed by a synchronization signal manager as described with reference to FIGS. 9 through 12.

At block 2120 the base station 105 may transmit a layer 1 signal indicating a configuration of the synchronization signal. The operations of block 2120 may be performed according to the methods described with reference to FIGS. 1 through 8. In certain examples, aspects of the operations of block 2120 may be performed by a configuration signaling manager as described with reference to FIGS. 9 through 12.

At block 2125 the base station 105 may transmit the synchronization signal in accordance with the configuring. The operations of block 2125 may be performed according to the methods described with reference to FIGS. 1 through 8. In certain examples, aspects of the operations of block 2125 may be performed by a synchronization signal manager as described with reference to FIGS. 9 through 12.

Figure 22:
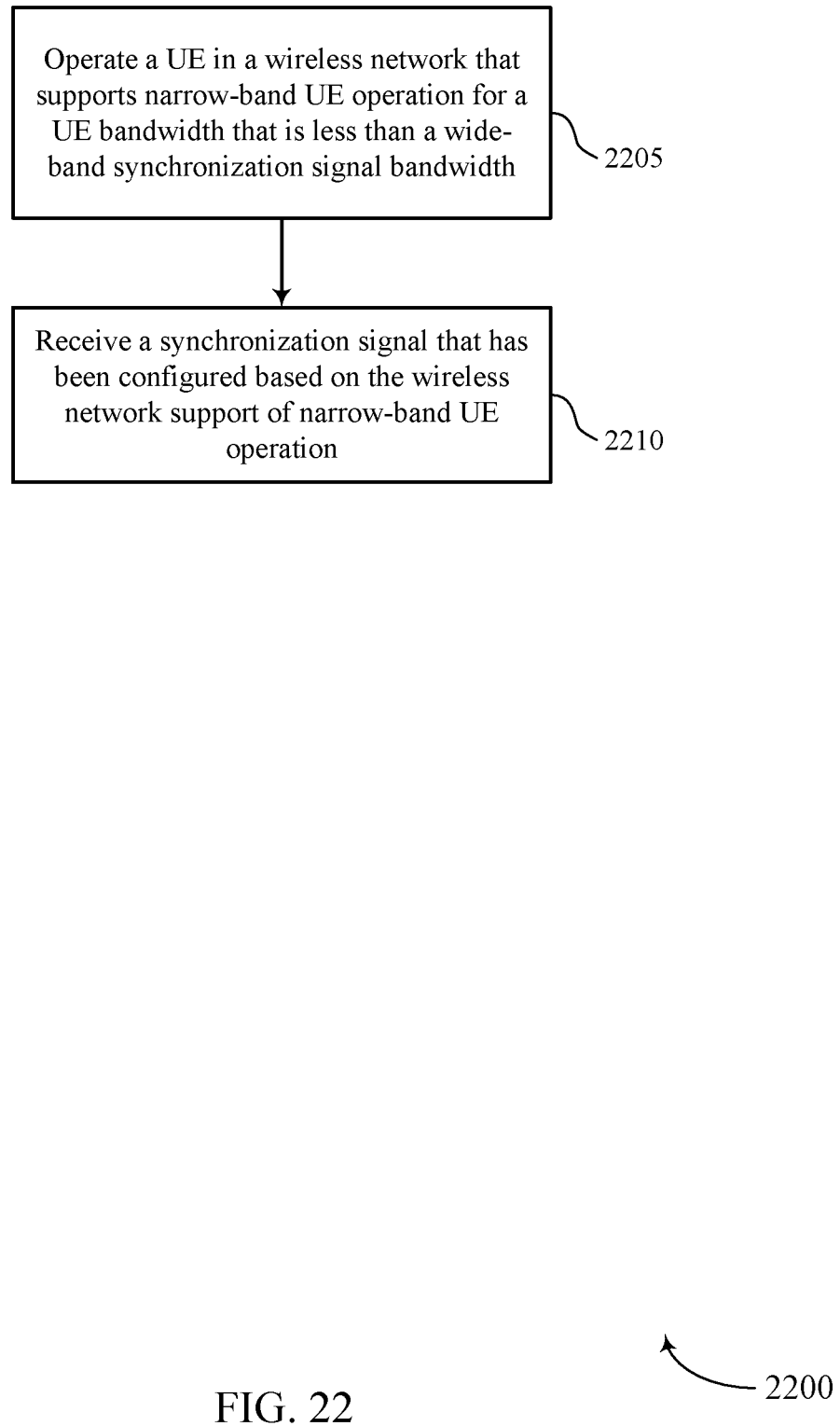

FIG. 22 shows a flowchart illustrating a method 2200 for synchronization techniques for UE operation bandwidths less than synchronization signal bandwidths in accordance with aspects of the present disclosure. The operations of method 2200 may be implemented by a UE 115 or its components as described herein. For example, the operations of method 2200 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may operate a UE in a wireless network that supports narrowband UE operation for a UE bandwidth that is less than a wideband synchronization signal bandwidth. The operations of block 2205 may be performed according to the methods described with reference to FIGS. 1 through 8. In certain examples, aspects of the operations of block 2205 may be performed by a UE bandwidth manager as described with reference to FIGS. 13 through 16.

At block 2210 the UE 115 may receive a synchronization signal that has been configured based at least in part on the wireless network support of narrowband UE operation. The operations of block 2210 may be performed according to the methods described with reference to FIGS. 1 through 8. In certain examples, aspects of the operations of block 2210 may be performed by a synchronization signal manager as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying that a user equipment (UE) supports operation within a UE bandwidth that is less than a synchronization signal bandwidth used by a radio access technology to transmit a synchronization signal;
   performing a cell search of subbands associated with a synchronization signal raster based at least in part on the UE bandwidth being less than the synchronization signal bandwidth, wherein the synchronization signal raster comprises a subband resolution that is based at least in part on the UE bandwidth being less than the synchronization signal bandwidth;
   receiving the synchronization signal based at least in part on the cell search; and
   transmitting a message on a random access channel (RACH) determined based at least in part on the received portion of the synchronization signal.

2. The method of claim 1, wherein the synchronization signal raster comprises a subband resolution that is greater than a resolution used for UE operating bandwidth that is at least equal to the synchronization signal bandwidth.

3. The method of claim 1, wherein performing the cell search of subbands comprises limiting the cell search to a search of one or more subbands associated with a raster definition.

4. The method of claim 1, wherein performing the cell search of subbands comprises:
   limiting the cell search to a search of one or more subbands that at least partially overlap with the synchronization signal bandwidth.

5. The method of claim 1, wherein:
   performing the cell search of subbands comprises: limiting the cell search to a search of one or more subbands that each overlap with a predetermined portion of the synchronization signal.

6. An apparatus for wireless communication, comprising:
   a processor,
   memory coupled with the processor; and
   instructions stored in the memory and executable by the processor to cause the apparatus to:
     identify that a user equipment (UE) supports operation within a UE bandwidth that is less than a synchronization signal bandwidth used by a radio access technology to transmit a synchronization signal;
     perform a cell search of subbands associated with a synchronization signal raster based at least in part on the UE bandwidth being less than the synchronization signal bandwidth, wherein the synchronization signal raster comprises a subband resolution that is based at least in part on the UE bandwidth being less than the synchronization signal bandwidth;
     receive the synchronization signal based at least in part on the cell search; and
     transmit a message on a RACH determined based at least in part on the received portion of the synchronization signal.

7. The apparatus of claim 6, wherein the synchronization signal raster comprises a subband resolution that is greater than a resolution used for UE operating bandwidth that is at least equal to the synchronization signal bandwidth.

8. The apparatus of claim 6, wherein performing the cell search of subbands comprises limiting the cell search to a search of one or more subbands associated with a raster definition.

9. The apparatus of claim 6, wherein the instructions to cause the apparatus to perform the cell search of subbands comprises instructions executable by the processor to cause the apparatus to:
   limit the cell search to a search of one or more subbands that at least partially overlap with the synchronization signal bandwidth.

10. The apparatus of claim 6, wherein the instructions to cause the apparatus to perform the cell search of subbands comprises instructions executable by the processor to cause the apparatus to:

limit the cell search to a search of one or more subbands that each overlap with a predetermined portion of the synchronization signal.

11. An apparatus for wireless communication, comprising:
   means for processing configured to identifying that a user equipment (UE) supports operation within a UE bandwidth that is less than a synchronization signal bandwidth used by a radio access technology to transmit a synchronization signal;
   means for processing configured to performing a cell search of subbands associated with a synchronization signal raster based at least in part on the UE bandwidth being less than the synchronization signal bandwidth, wherein the synchronization signal raster comprises a subband resolution that is based at least in part on the UE bandwidth being less than the synchronization signal bandwidth;
   means for processing configured to receiving the synchronization signal based at least in part on the cell search; and
   means for processing configured to transmit a message on a RACH determined based at least in part on the received portion of the synchronization signal.

12. The apparatus of claim 11, wherein the synchronization signal raster comprises a subband resolution that is greater than a resolution used for UE operating bandwidth that is at least equal to the synchronization signal bandwidth.

13. The apparatus of claim 11, wherein the means for performing the cell search of subbands comprises:
   means for limiting the cell search to a search of one or more subbands associated with a raster definition.

14. The apparatus of claim 11, wherein the means for performing the cell search of subbands comprises:
   means for limiting the cell search to a search of one or more subbands that at least partially overlap with the synchronization signal bandwidth.

15. The apparatus of claim 11, wherein the means for performing the cell search of subbands comprises:
   means for limiting the cell search to a search of one or more subbands that each overlap with a predetermined portion of the synchronization signal.

16. A non-transitory computer-readable medium storing code for wireless communication at a user equipment (UE) operating in a disconnected state, the code comprising instructions executable by a processor to:
   identify that a user equipment (UE) supports operation within a UE bandwidth that is less than a synchronization signal bandwidth used by a radio access technology to transmit a synchronization signal, wherein the synchronization signal raster comprises a subband resolution that is based at least in part on the UE bandwidth being less than the synchronization signal bandwidth;
   perform a cell search of subbands associated with a synchronization signal raster based at least in part on the UE bandwidth being less than the synchronization signal bandwidth;
   receive the synchronization signal based at least in part on the cell search; and
   transmit a message on a RACH determined based at least in part on the received portion of the synchronization signal.

17. The non-transitory computer-readable medium of claim 16, wherein the synchronization signal raster comprises a subband resolution that is greater than a resolution used for UE operating bandwidth that is at least equal to the synchronization signal bandwidth.

18. The non-transitory computer-readable medium of claim 16, wherein the code comprising instructions executable by the processor to perform the cell search of subbands comprises instructions executable by the processor to:
   limit the cell search to a search of one or more subbands associated with a raster definition.

19. The non-transitory computer-readable medium of claim 16, wherein the code comprising instructions executable by the processor to perform the cell search of subbands comprises instructions executable by the processor to:
   limit the cell search to a search of one or more subbands that at least partially overlap with the synchronization signal bandwidth.

20. The non-transitory computer-readable medium of claim 16, wherein the code comprising instructions executable by the processor to perform the cell search of subbands comprises instructions executable by the processor to:
   performing the cell search of subbands comprises: limiting the cell search to a search of one or more subbands that each overlap with a predetermined portion of the synchronization signal.

* * * * *